(12) United States Patent
Hutter, III et al.

(10) Patent No.: US 12,188,500 B2
(45) Date of Patent: Jan. 7, 2025

(54) HEATER ASSEMBLY FOR ACCELERATING ATTACHMENT CURING

(71) Applicant: Physical Systems, Inc., Carson City, NV (US)

(72) Inventors: Charles G. Hutter, III, Carson City, NV (US); Jerry W. Shorter, Wellington, NV (US)

(73) Assignee: Physical Systems, Inc., Carson City, NV (US)

( * ) Notice: Subject to any disclaimer, the term of this patent is extended or adjusted under 35 U.S.C. 154(b) by 108 days.

(21) Appl. No.: 17/577,247

(22) Filed: Jan. 17, 2022

(65) Prior Publication Data
US 2022/0136546 A1    May 5, 2022

Related U.S. Application Data

(63) Continuation-in-part of application No. 15/597,953, filed on May 17, 2017, now Pat. No. 11,229,089.
(Continued)

(51) Int. Cl.
*F16B 11/00* (2006.01)
*B29C 35/02* (2006.01)
(Continued)

(52) U.S. Cl.
CPC ............ *F16B 11/006* (2013.01); *B29C 35/02* (2013.01); *F23B 60/00* (2013.01); *G05D 23/24* (2013.01);
(Continued)

(58) Field of Classification Search
CPC ........ H05B 1/0247; H05B 1/023; H05B 3/06; H05B 3/141; H05B 3/34; H05B 6/101; H05B 6/10; F16B 11/006
(Continued)

(56) References Cited

U.S. PATENT DOCUMENTS

| | | | | |
|---|---|---|---|---|
| 4,139,408 A | * | 2/1979 | Kobetsky | .................. C09J 5/06 24/304 |
| 4,804,433 A | * | 2/1989 | Smith | ........................ C09J 5/06 156/359 |

(Continued)

FOREIGN PATENT DOCUMENTS

JP          10002020 A  *  1/1998

OTHER PUBLICATIONS

Machine translation of JP 10-002020. (Year: 1998).*

*Primary Examiner* — Steven W Crabb
*Assistant Examiner* — Alba T Rosario-Aponte
(74) *Attorney, Agent, or Firm* — Lowry Blixseth APC; Scott M. Lowry

(57) ABSTRACT

The heater assembly includes a case having a heating element therein, a channel extending through the case and having a size and shape for selectively receiving therethrough a first end of an elastomeric fixture outstretched through a substrate to a first length having a first width, and a heat transfer surface positioned relative to the heating element for receiving generated heat therefrom. The heat transfer surface is generally positionable relative to the substrate to cooperate with an adhesively bondable attachment coupled to a second end of the elastomeric fixture opposite the first end and including an uncured bonding agent disposed thereon. The heater assembly and attachment simultaneously sandwich the substrate in compression engagement in between when the elastomeric fixture extends through the substrate into the central channel and relaxes to a second relatively shorter length having a second relatively larger width.

40 Claims, 14 Drawing Sheets

Related U.S. Application Data

(60) Provisional application No. 62/338,419, filed on May 18, 2016.

(51) Int. Cl.
| | |
|---|---|
| *B29C 35/08* | (2006.01) |
| *B29C 65/48* | (2006.01) |
| *F23B 60/00* | (2006.01) |
| *G05D 23/24* | (2006.01) |
| *H05B 1/02* | (2006.01) |
| *H05B 3/58* | (2006.01) |
| *H05B 6/10* | (2006.01) |

(52) U.S. Cl.
CPC ............... *H05B 1/023* (2013.01); *H05B 3/58* (2013.01); *B29C 2035/0211* (2013.01); *B29C 2035/0811* (2013.01); *B29C 65/4835* (2013.01); *H05B 6/101* (2013.01)

(58) Field of Classification Search
USPC ........................................ 219/535, 520, 528
See application file for complete search history.

(56) References Cited

U.S. PATENT DOCUMENTS

| | | | |
|---|---|---|---|
| 2003/0116282 A1* | 6/2003 | Hutter, III | F16B 37/048 |
| | | | 156/380.2 |
| 2007/0051718 A1* | 3/2007 | Schmitt | B29C 66/474 |
| | | | 219/635 |
| 2012/0227889 A1* | 9/2012 | Schmitt | B23P 19/006 |
| | | | 156/359 |

* cited by examiner

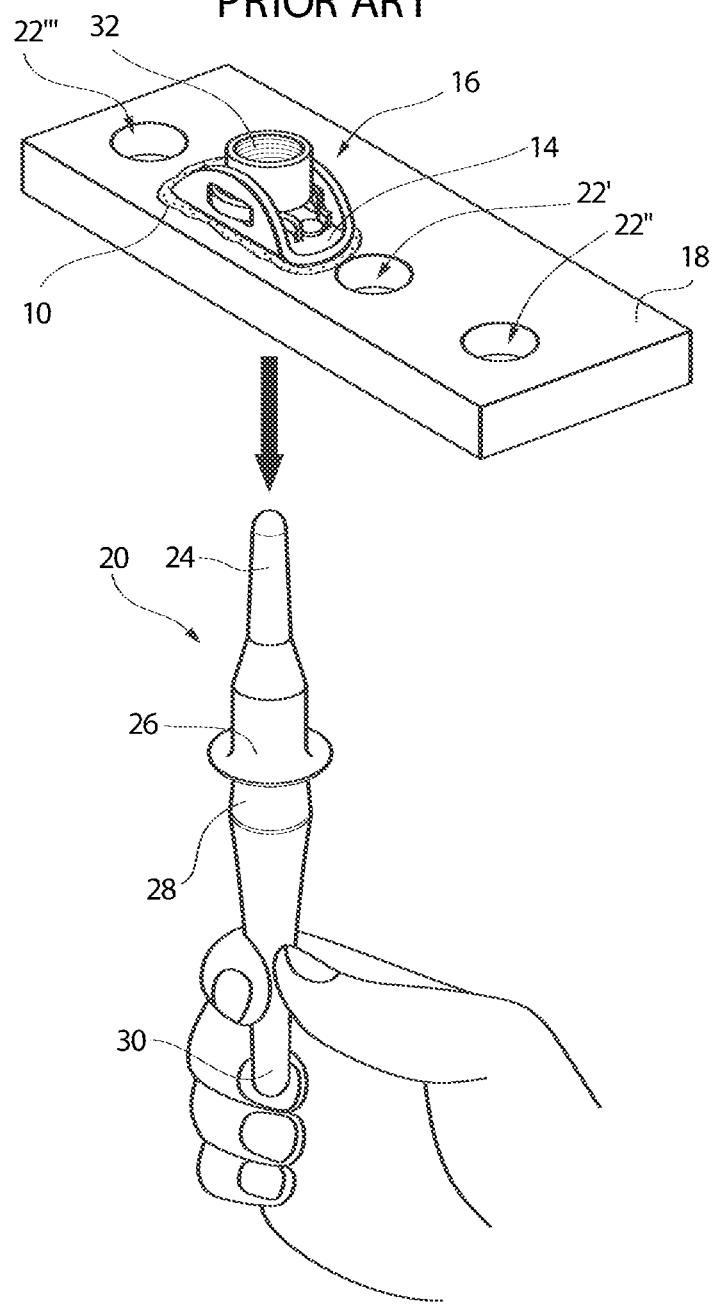

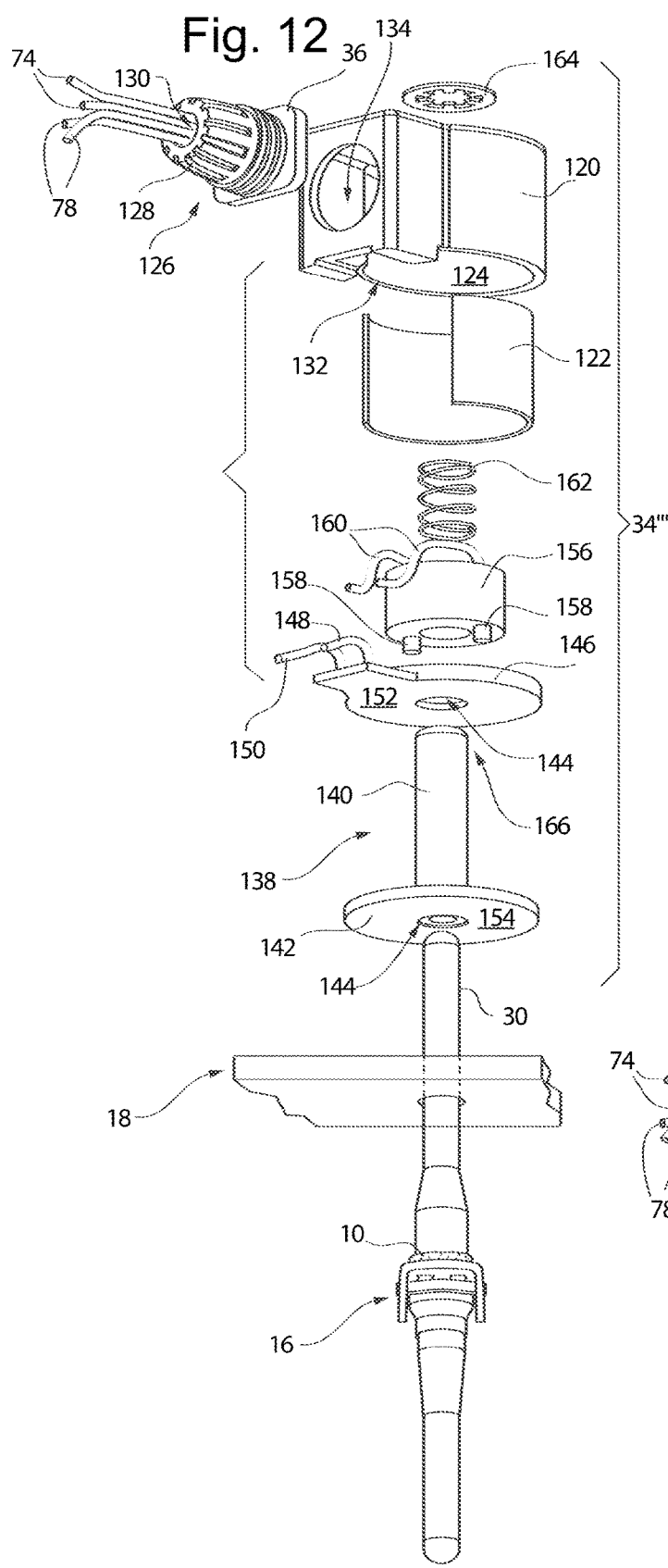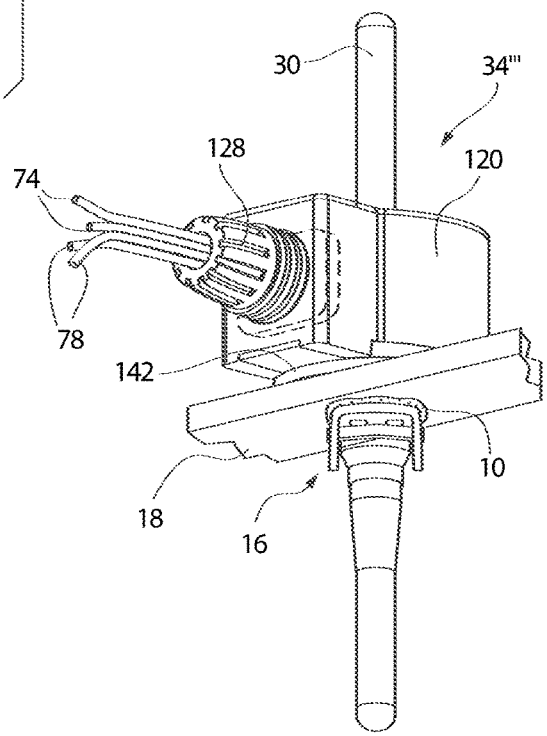

HEATER ASSEMBLY FOR ACCELERATING ATTACHMENT CURING

The present application is a continuation-in-part of U.S. application Ser. No. 15/597,953 filed May 17, 2017, the contents of which are herein incorporated by reference in their entirety, which claims priority to U.S. Application No. 62/338,419 filed May 18, 2016, the contents of which are also herein incorporated by reference in their entirety.

BACKGROUND OF THE INVENTION

The present invention generally relates to a heater assembly for accelerating attachment curing. More specifically, the present invention relates to a heater assembly having a central channel for selectively receiving and retaining an elastomeric fixture that extends from one end of an adhesively bondable attachment (e.g., a nutplate fastener assembly), the elastomeric fixture draws the heater assembly and the attachment into engagement with opposite sides of a substrate in substantial axial alignment thereof such that the heater assembly is able to apply heat to the substrate to accelerate heat curing of the adhesive on the baseplate of the attachment.

Attachments such as nutplates are generally known in the art and may be used to close out structural areas with no backside access, including attachment of skins and access panels, completion of structural mate joints, installation of equipment, or securing radomes and antennas. FIG. 1 illustrates an adhesive bonding agent 10 that may be dispensed from an applicator 12 along a portion of a baseplate 14 of an open nutplate fastener assembly 16, as is known in the art to prepare the open nutplate fastener assembly 16 for securement to a desired structure or substrate 18 (FIGS. 2A and 2B). To facilitate installation, an elastomeric fixture 20 may center each open nutplate fastener assembly 16 with a respective fastener aperture 22 to provide clamp up during adhesive cure, and to prevent intrusion of the adhesive bonding agent 10 into the aperture 22 (including any nut threads) during application and the curing process. As shown best in FIG. 1, the elastomeric fixture 20 may include a first handle section 24 that enlarges into a wider nut element retaining section 26 secured within the open nutplate fastener assembly 16 by friction fit engagement therewith. The elastomeric fixture 20 may further include a mounting section 28 positioned underneath the baseplate 14 that transitions into a relatively smaller second handle section 30. To install, the second handle section 30 of the elastomeric fixture 20 is pulled through the aperture 22 (FIG. 2A) thereby drawing the baseplate 14 of the open nutplate fastener assembly 16 having the adhesive bonding agent 10 thereunder into engagement with the substrate 18 (FIG. 2B). As shown in FIG. 2A, the elastomeric fixture 20 may stretch and deform to permit insertion and pull through engagement into and through the aperture 22. Once seated as shown in FIG. 2B, to achieve maximum bond strength, the elastomeric fixture 20 helps provide a positive force drawing the baseplate 14 in against the substrate 18 during at least an initial period of time for curing of the selected adhesive bonding agent 10 at the interface of the substrate 18 as a result of elastomeric pressure therein. Following cure, the bond between the baseplate 14 and the substrate 18 is permanent and impervious for use in typical aerospace and industrial environments. The elastomeric fixture 20 can then be pulled out from the substrate 18 and the open nutplate fastener assembly 16 through the aperture 22 in the substrate 18, as shown generally in FIG. 3.

Such nutplate fastener assemblies may come in a variety of configurations, such as open nutplate fastener assemblies and/or sealed nutplate fastener assemblies. Open nutplate fastener assemblies, like the one illustrated in FIGS. 1-3 and 7-8, e.g., are used to secure panels, skins, and access covers in applications where fluid or pressure sealing is not required. Variants with clip retained nut elements permit post-installation nut replacement. In another example, sealed nutplate fastener assemblies, like the one illustrated in FIGS. 4-5 and 10, are ideal for closeout of fluid-filled bays and tanks or pressure vessels and are suitable for submerged application in aerospace fuels and industrial fluids when installed with compatible adhesives. Such nutplate fastener assemblies have a wide variety of uses, including military and private and/or commercial aircraft.

One drawback known in the art is the time it takes to repair a bonded nutplate fastener assembly that needs removal and/or repair. This is due, in large part, to the time it takes to cure the adhesive bonding agent used to couple the nutplate fastener assembly to the substrate. For example, a two-part epoxy-based adhesive can take up to 24 hours to cure at room temperature. This 24-hour curing period may be necessary for the adhesive bonding agent to develop the strength required to hold the nutplate in place. As such, the 24-hour wait time can negatively affect the availability of the military, private, and/or commercial aircraft. Such a waiting time is necessary with known nutplates and curing procedures as it ensures that the adhesively bonded nutplate remains secured against the substrate, so other components may be later tightened (e.g., a bolt used to draw two surfaces together). Such nutplate repair may be needed in applications that include access panels that need to be reattached to an aircraft or the like.

There exists, therefore, a significant need in the art for a heater assembly and method for accelerating curing of an adhesive bonding agent to a substrate in four hours or less, such as by way of applying a controlled elevated temperature cure schedule to the adhesive bondline under the nutplate baseplate by way of engaging the heater assembly with the substrate underneath the adhesive by an elastomeric fixture or the like. The present invention fulfills these needs and provides further related advantages.

SUMMARY OF THE INVENTION

In one embodiment, the heater assembly disclosed herein may include an outer casing having a central channel therein for selectively receiving and retaining in friction-fit relation an elastomeric fixture from an attachment that axially aligns the heater assembly with the attachment. The outer casing may enclose a heater element generally disposed circumferentially around the central channel and include a thermal insulated cover to direct heat energy toward a heat transfer surface that includes a thermally conductive pressure pad in engagement with a substrate underneath a baseplate of the attachment having an adhesive bonding agent thereon, wherein the heat transfer surface imparts heat energy to the adhesive bonding agent thereby curing the adhesive in four hours or less.

In another embodiment, another heater assembly as disclosed herein may include a case having a heating element therein, a channel extending through the case and having a size and shape for selectively receiving therethrough a first end of an elastomeric fixture outstretched through a substrate to a first length having a first width, and a heat transfer surface positioned relative to the heating element for receiving generated heat therefrom. The heat transfer surface may be generally positionable relative to the substrate to cooperate with an adhesively bondable attachment coupled to a second end of the elastomeric fixture opposite the first end and having an uncured bonding agent disposed thereon. As such, the heat transfer surface and the adhesively bondable attachment may simultaneously sandwich the substrate in compression engagement when the elastomeric fixture extending through the substrate and into the central channel relaxes to a second relatively shorter length having a second relatively larger width.

In another aspect of this embodiment, an electrical lead may couple the heating element to a power source for providing on-demand energy to the heating element. Here, the heating element may include a resistance heater, an induction heater, or a coil heater. More specifically, in one embodiment, the heating element may include a heater coil generally circumferentially wound about the channel for generating heat in adjacent relation relative to the heat transfer surface. A controller coupled with the heating element, such as the heater coil, may regulate an amount of current delivered to the heater assembly to regulate the temperature thereof. Here, a temperature probe extending relative to the case by a distance sufficient to contact the substrate when the heater assembly may be in compression engagement therewith and may take real-time temperature measurements. Alternatively, the heating element may include a thermistor generally enclosed within a thermal insulative cover by a thermal conductive pad. In this embodiment, the thermistor may include a ceramic or a sintered semiconductor material including an integrated feedback loop having a negative temperature coefficient that increases electrical resistance and decreases heat production with increased temperature and decreases electrical resistance and increases heat production with decreased temperature.

In another aspect of this embodiment, a thermal insulation layer may be disposed to an exterior of the heating element. More specifically, the thermal insulation layer may include an insulative cover or an insulative sleeve positioned between the case and the heating element. Additionally, the case may include a cylindrical case having a pair of housings configured for snap-fit engagement with one another to generally circumferentially enclose the heating element therein. The adhesively bondable attachment may include an open nutplate fastener assembly or a sealed nutplate fastener assembly. Moreover, the heat transfer surface may include a flexible heater pad deformable for flush engagement with a curved substrate. More specifically, the flexible heater pad may include a single circumferential heater pad generally encompassing the channel or multiple flexible heater pads disposed at relatively equidistant locations about the channel.

Moreover, in another embodiment, the heating element may include a fuel ring formed about the channel and positioned in adjacent relation with the heat transfer surface. Here, a fuse may selectively couple with a fuel ring that includes a solid fuel pyrotechnic ring. The fuse may provide for igniting the solid fuel pyrotechnic ring from a distance. Additionally with respect to this embodiment, the case may include one or more vent ports for venting combustion gases out from within the case during burning of the fuel ring. The case may also include a rolled lower edge generally projecting inwardly and at least partially extending over and trapping therein a heat transfer surface pad having the heat transfer surface thereon while simultaneously exposing the heat transfer surface for contact with the substrate. The heat transfer surface pad itself may include a beveled edge accommodating inward projection of the rolled lower edge about the heat transfer surface pad.

The heating element may also include a conductive material having an internal fluid passage therein for receiving fluid at a relatively high temperature. Here, the conductive material may conductively transfer heat from the relatively higher temperature fluid flowing therethrough to the heat transfer surface. The internal fluid passage may include a toroidal fluid passage that couples to an inlet hose at one port and an outlet hose on another port, and receive circulated and/or recirculated heated water therethrough during heating. A controller may regulate the temperature of the circulated and/or recirculated heated water during heating thereof to maintain the surface of the substrate at an optimal temperature to heat the adhesive bonding agent to a temperature to minimize curing time.

In another embodiment, a heater assembly as disclosed herein may include a cylindrical case including a pair of housings configured for engagement with one another to generally circumferentially enclose a cylindrically wound heater coil therein. A central channel may extend through the case and have a size and shape for selectively receiving therethrough a first end of an elastomeric fixture outstretched through a substrate to a first length having a first diameter. Additionally, a heat transfer surface may be positioned relative to the heater coil for receiving generated heat therefrom. Here, the heat transfer surface may be generally positionable relative to the substrate to cooperate with an adhesively bondable attachment coupled to a second end of the elastomeric fixture opposite the first end and having an uncured bonding agent disposed thereon to simultaneously sandwich the substrate in coaxial compressive engagement when the elastomeric fixture extending through the substrate and into the central channel relaxes to a second relatively shorter length having a second relatively larger diameter. In this embodiment, a temperature probe may extend relative to the cylindrical case by a distance sufficient to contact the substrate when the heater assembly is in compressive engagement therewith with the adhesively bondable attachment.

Additionally, this embodiment may include an electrical lead coupling the heater coil to a power source regulated by a controller for providing on-demand regulated current to the heater coil. A thermal insulation layer may also be disposed to an exterior of the heater coil, wherein the thermal insulative layer may include an insulative cover or an insulative sleeve positioned between the cylindrical case and the heater coil. The heat transfer surface may include a flexible heater pad deformable for flush engagement with a curved substrate. Additionally, the flexible heater pad may include a single circumferential heater pad generally encompassing the central channel or multiple flexible heater pads disposed at relatively equidistant locations about the central channel. The adhesively bondable attachment may include an open nutplate fastener assembly or a closed nutplate fastener assembly.

In another alternative embodiment, the heater assembly may include an insulative case cooperating with a thermal conductive pad to generally encase a heating element that includes a thermistor therein. More specifically, the thermistor may include a ceramic or a sintered semiconductor material including an integrated feedback loop having a negative temperature coefficient that increases electrical resistance and decreases heat production with increased temperature and decreases electrical resistance and increases heat production with decreased temperature. A central channel may extend through the insulative case and have a size and shape for selectively receiving therethrough a first end of an elastomeric fixture outstretched through a substrate to a first length having a first diameter. The thermal conductive pad may then be positioned relative to the heating element for receiving generated heat therefrom. Here, the thermal conductive pad may also be generally positionable relative to the substrate to cooperate with an adhesively bondable attachment coupled to a second end of the elastomeric fixture opposite the first end and having an uncured bonding agent disposed thereon to simultaneously sandwich the substrate in coaxial compression engagement when the elastomeric fixture extending through the substrate and into the central channel retracts to a second relatively shorter length having a second relatively larger diameter.

This embodiment may also include an electrical lead coupling the heating element to a power source for providing on-demand current to the heating element. A controller coupled with the heating element may then regulate an amount of current delivered to the heater assembly. In these embodiments, the adhesively bondable attachment may include an open nutplate fastener assembly or a sealed nutplate fastener assembly.

In another alternative embodiment, the heater assembly may include a case generally enclosing a heating element that includes a ceramic heater. A thermocouple within the case may be generally biased into engagement with the ceramic heater, such as by way of a coil spring or the like. An interface plate proximate the thermocouple (e.g., positioned in flush engagement therewith) may receive heat energy generated thereby and have a central channel extending through the case and the thermocouple. The central channel may have a size and shape for selectively receiving therethrough a first end of an elastomeric fixture outstretched through a substrate to a first length having a first diameter. Moreover, a heat transfer surface may outwardly face from the interface plate and be generally positionable relative to the substrate to cooperate with an adhesively bondable attachment coupled to a second end of the elastomeric fixture opposite the first end and having an uncured bonding agent disposed thereon to simultaneously sandwich the substrate in coaxial compression engagement when the elastomeric fixture extending through the substrate and into the central channel retracts to a second relatively shorter length having a second relatively larger diameter.

Another feature of this embodiment may include at least one sensor extending from the thermocouple and proximate the ceramic heater for sensing a real-time temperature of the ceramic heater. Here, the thermocouple may include at least one lead configured for electrical coupling to a remote controller. The remote controller may also electrically couple with the ceramic heater for regulation of current delivered thereto in response to real-time temperature measurements of the ceramic heater. In other aspects of this embodiment, the heater assembly may include an insulative sleeve positioned between the case and the ceramic heater or a spring positioned between the case and the thermocouple. Furthermore, the central channel may include a tube extending through the thermocouple, the spring, and the case and held therein by a retaining ring mountable to the tube outside the case.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is an environmental perspective view illustrating removal of the elastomeric fixture from the open nutplate fastener assembly of FIGS. 2A and 2B bonded to the substrate, as is known in the art;

FIG. 5 is an environmental perspective view more specifically illustrating the sealed nutplate fastener assembly coaxially aligned with the heater assembly by way of the elastomeric fixture and having the substrate sandwiched in between;

FIG. 12 is an exploded perspective view of another alternative embodiment of a heater assembly as disclosed herein;

FIG. 13 is a perspective view of the alternative embodiment of the heater assembly of FIG. 12 illustrated installed with the open nutplate fastener assembly on a substrate;

DETAILED DESCRIPTION OF THE PREFERRED EMBODIMENTS

Figure 4:
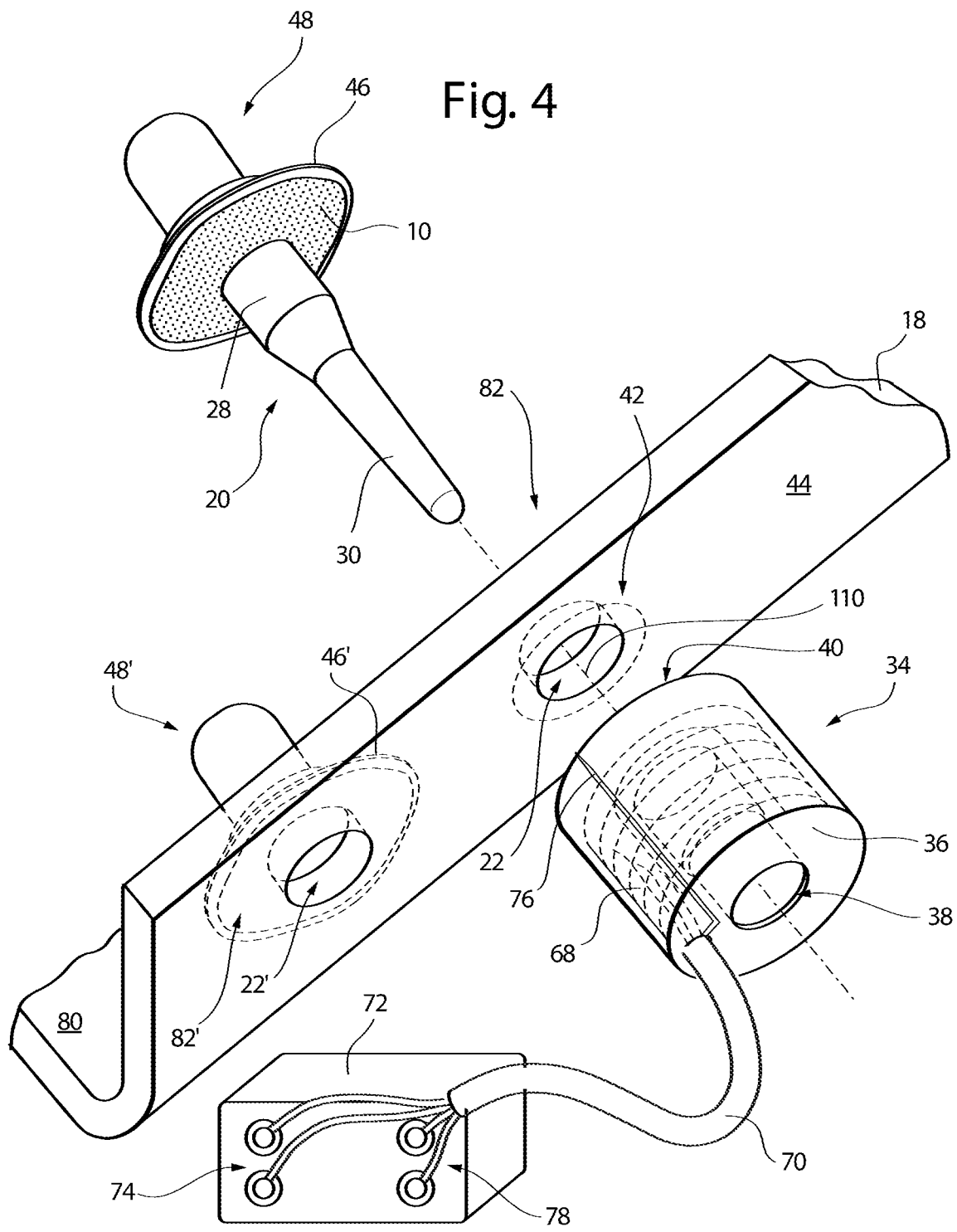
FIG. 4 is an environmental perspective view illustrating one embodiment of a heater assembly having a heater coaxially aligned with a baseplate of a sealed nutplate fastener assembly by way of an elastomeric fixture, thereby sandwiching the substrate in between for enhanced heated curing of the adhesive bonding agent underneath the baseplate.
Figure 5:
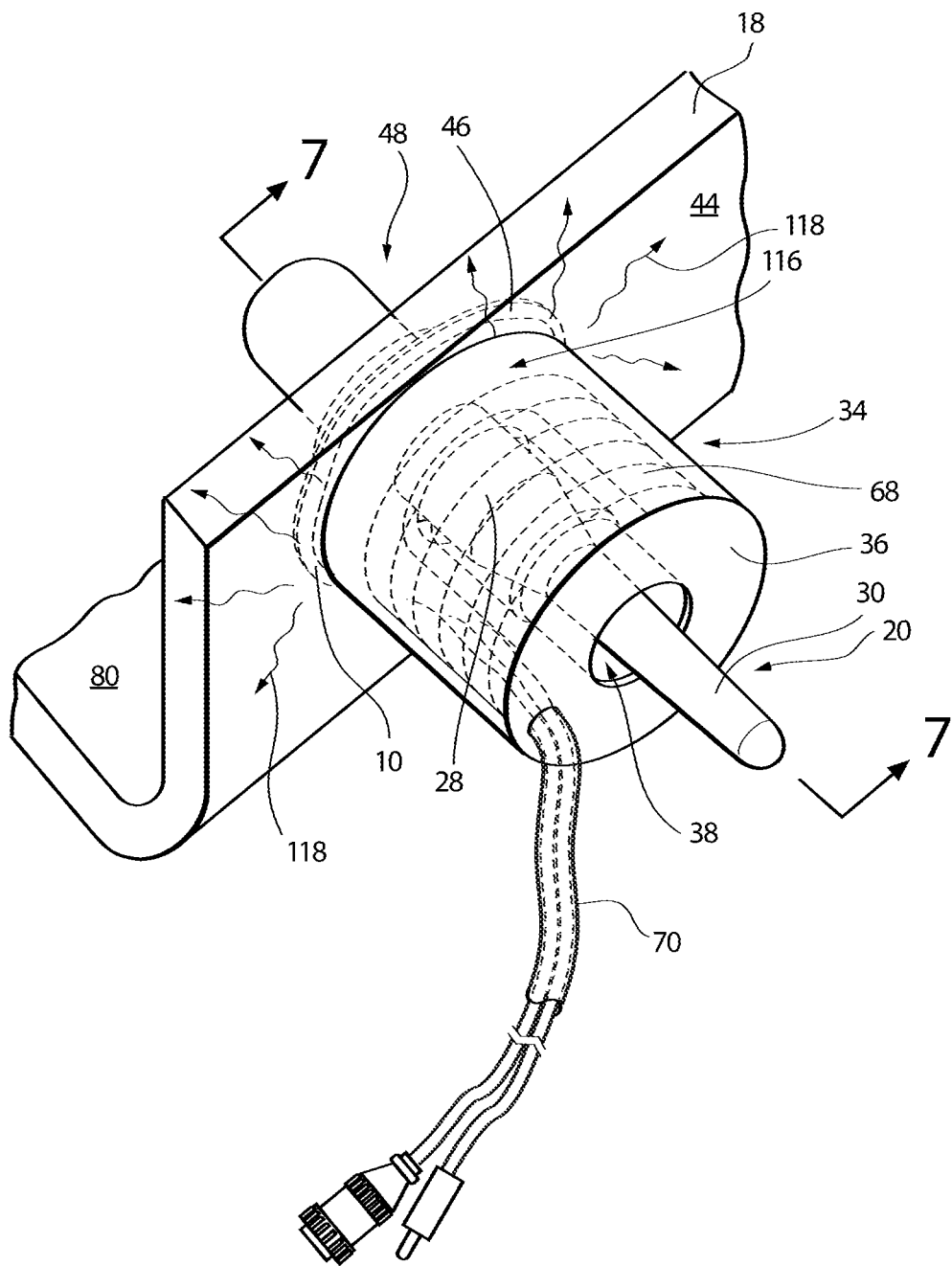
Figure 6:
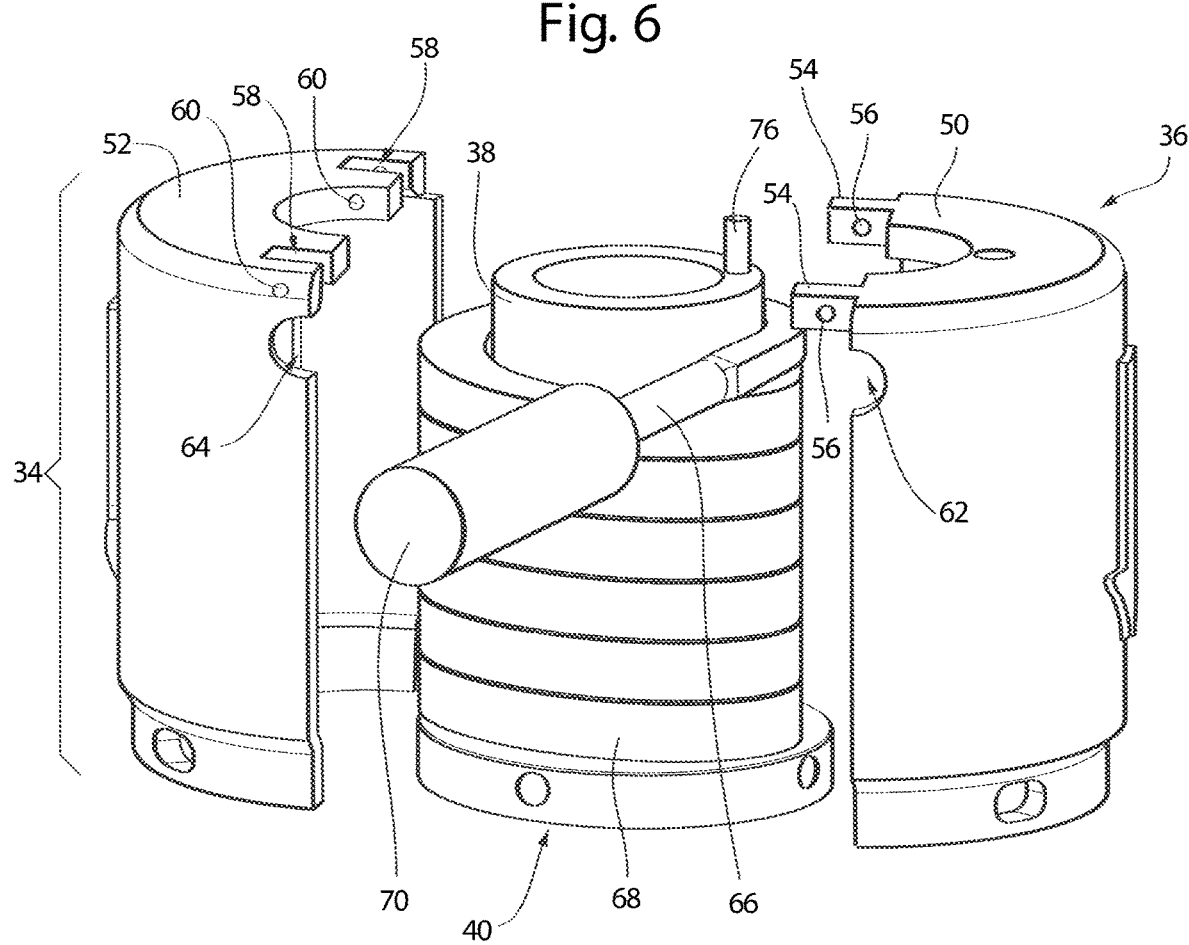
FIG. 6 is a partial exploded perspective view of one embodiment of the heater assembly, further illustrating a cylindrical case generally enclosing a heater coil therein.

As shown in the exemplary drawings for purposes of illustration, one embodiment of a heater assembly as disclosed herein is generally referred to by reference number 34 in FIGS. 4-6. Alternative embodiments of the heater assembly are referenced in FIG. 7 with respect to reference numeral 34', in FIGS. 8-10 with respect to reference numeral 34'', and in FIGS. 12-14 with respect to reference numeral 34'''. With respect to FIGS. 4-6, one embodiment of the heater assembly 34 generally includes an outer cylindrical case 36 (e.g., a thermal insulated cover) with a central channel 38 therein to accommodate slide-through passage of the elastomeric fixture 20, as discussed in more detail below. The cylindrical case 36 may include a heat transfer face 40 (best shown in FIG. 6) at one end designed to supply temperature-controlled heating to a heating area 42 on a bottom surface 44 of the substrate 18. In this respect, the heating area 42 on the bottom surface 44 may be substantially commensurate in scope with the surface area of a sealed nutplate baseplate 46 of a sealed nutplate fastener assembly 48 having the adhesive bonding agent 10 thereon. Accordingly, the heater assembly 34 is able to transfer heat to the area 42 on the substrate 18 approximately where the uncured adhesive bonding agent 10 lands thereon during nutplate attachment and curing.

The cylindrical case 36 is illustrated in FIG. 6 in more detail, and may include a pair of housings 50, 52 configured for snap-fit engagement to one another for encasing or enclosing an internal heater coil 68 in the manner generally shown with respect to FIGS. 4 and 5. For example, the first housing 50 may include a pair of projections 54 that each include a pair of ball detents 56 configured for snap fit engagement with the second housing 52 via a respective pair of engagements channels 58, each having a pair of receptacles 60 configured to selectively receive and retain the respective projections 54 and the ball detents 56. Each of the housings 50, 52 may also include a respective hemispherical cut out 62, 64 configured to selectively encircle a portion 66 of a heater coil 68 outwardly extending out from the cylindrical case 36 and coupled with an external cord 70. Here, the heater coil 68 is circumferentially wound about the central channel 38 within the heater assembly 34 to evenly generate heat therein for transfer to the heat transfer face 40. In general, the heater coil 68 is able to generate heat within the cylindrical case 36, such as by way of resistance heating, induction heating, coil heating, etc. The heater coil 68 may exit the cylindrical case 36 and be enclosed by the external cord 70 that couples to an electric heater control box 72 (FIG. 4) at an opposite end thereof, such as by way of a pair of heater power leads 74.

The heater control box 72 may regulate the amount of power delivered to the heater assembly 34 to selectively adjust and/or maintain the temperature delivered to the heating area 42 by the heat transfer face 40. In one embodiment, the heater power leads 74 may deliver a constant amount of energy to the heater assembly 34 to provide constant heating to the heating area 42. Such energy may be provided by way of direct current ("DC"), alternating current ("AC"), or high frequency energy.

Alternatively, the heater assembly 34 may include an internally disposed temperature probe 76 within the cylindrical case 36 (FIGS. 4 and 7) or a thermocouple 77 (FIG. 6) that senses the temperature of the heater assembly 34, such as at or near the heat transfer face 40 and/or at or near the heating area 42, and relays that information back to the electric heater control box 72 in real-time by way of a pair of thermocouple leads 78. The temperature probe 76 may also be able to determine the temperature of the internally disposed or positioned heater coil 68. In this respect, the electric heater control box 72 may change the amount of energy delivered to the heater assembly 34 in real-time in response to temperature readings taken from the temperature probe 76. Depending on the characteristics of the adhesive bonding agent 10 and/or the characteristics (e.g., material, thickness, conductivity, etc.) of the bottom surface 44 and/or the substrate 18, the heater assembly 34 can, in real-time, regulate and optimize heating and the resulting curing schedule of the adhesive bonding agent 10 once it is disposed on a top surface 80 of the substrate 18.

In one embodiment, the electric heater control box 72 may be able to develop a controlled temperature profile for the adhesive bonding agent 10, to accelerate curing in four hours or less and in a manner wherein the resulting cured adhesive meets or exceeds the standards (e.g., shear strength, torque strength, peel strength, pushout, impact strength, etc.) established by the original equipment manufacturer (OEM), as if the adhesive bonding agent were cured for twenty-four hours at room temperature. Additionally, such a temperature profile could ensure that the mechanical characteristics of the cured adhesive bonding agent comply with aerospace requirements, such that the nutplate fastener assembly may be used in aircraft environments, including military and/or commercial aircraft, and the like.

The heater assembly 34 is able to provide looped feedback to temperature control the heating area 42 by way of the temperature probe 76 coupled to the electric heater control box 72. This ensures that the desired temperature profile at a bondline area 82 (i.e., an area of the top surface 80 above the heating area 42 where the adhesive bonding agent 10 engages the substrate 18) can be maintained irrespective of the underlying substructure of the substrate 18, which may vary, e.g., from place to place on an aircraft. In one embodiment, the electric heater control box 72 may limit the cure temperature imparted on the bondline area 82 to a maximum of 180 degrees Fahrenheit (° F.) and the electric heater control box 72 may turn the heater coils 68 "off" if the temperature probe 76 detects that the temperature adjacent the bondline area 82 (i.e., near or along the heat transfer face 40 and/or the heating area 42) reaches a maximum temperature of, e.g., 200° F. To this end, the temperature probe 76 and the electric heater control box 72 may include safety thresholds that prevent run-away heating.

FIG. 4 further illustrates an embodiment of a sealed nutplate fastener assembly 48 in exploded relation to the bonding substrate 18 and a sealed nutplate fastener assembly 48' engaged with the substrate 18. In this embodiment, both of the sealed nutplate fastener assemblies 48, 48' are illustrated including respective baseplates 46, 46' having a diameter relatively larger than the corresponding aperture 22, 22' through which the elastomeric fixture 20 inserts. More specifically, the baseplate 46' of the sealed nutplate fastener assembly 48' is shown in FIG. 4 generally circumferentially encompassing the aperture 22' about the circumferential bondline area 82' in a manner that closes out the aperture 22' from the top surface 80, such as from a fluid-filled bay, tank, pressure vessel, etc. The sealed nutplate fastener assembly 48, 48' is particularly suitable for submerged application in aerospace fuels and industrial fluids when installed with a compatible adhesive bonding agent. Although, of course, the open nutplate fastener assembly 16 described above is also compatible with the heater assembly 34, whereby the open nutplate fastener assembly 16 may attach to the substrate 18 in four hours or less in the same general configuration as the sealed nutplate fastener assembly 48, 48' shown in FIG. 4.

The heater assembly 34 may be used to accelerate curing of the adhesive bonding agent 10 upon initial installation or on reinstallation, as mentioned above. Reinstalling (i.e., rebonding) the nutplate (e.g., the open nutplate fastener assembly 16 and/or the sealed nutplate fastener assembly 48) may occur in areas of an aircraft, e.g., with limited (i.e., confined and/or restricted) access to the surface of the substrate where the nutplate will be bonded, due to the limited ability to remove parts from the aircraft. Additionally, the heater assembly 34 may be compatible for use on-aircraft, i.e., by way of meeting explosion proof criteria (e.g., jet fuels or the like) and may be used with existing adhesive bonding agents known in the art.

Figure 7:
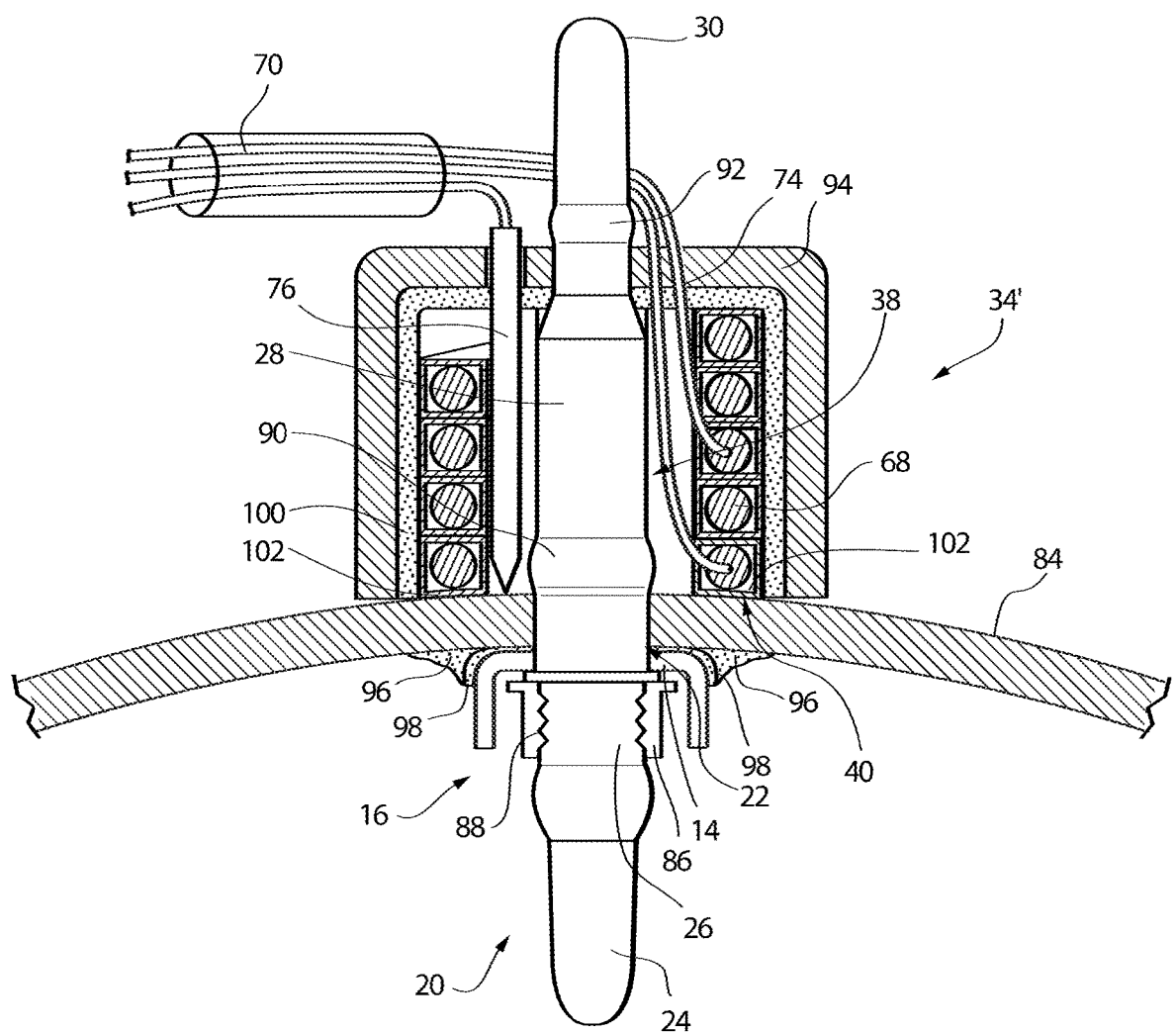
FIG. 7 is a cross-sectional view of an alternative heater assembly, similar to that taken along the line 7-7 in FIG. 5 except with the open nutplate fastener assembly instead of the sealed nutplate fastener assembly depicted in FIG. 5, further illustrating coaxial alignment of the open nutplate fastener assembly with the heather assembly having a flexible heater pad in flush engagement with a curved substrate.

FIG. 7 illustrates an alternative embodiment of a heater assembly 34' compatible for use with an angled or curved substrate 84. As shown in FIG. 7, the elastomeric fixture 20 coupled to the open nutplate fastener assembly 16 has been drawn through the aperture 22 and the central channel 38 of the heater assembly 34'. As described in more detail below, the cross-sectional view of FIG. 7 illustrates the elastomeric fixture 20 having the first handle section 24 protruding out from the open side of the open nutplate fastener assembly 16. The nut element retaining section 26 is firmly disposed within the interior of a nut element 86, thereby at least partially extending into a series of internal threads 88. FIG. 7 also illustrates that the mounting section 28 has a larger diameter relative to the nut element retaining section 26. Moreover, the elastomeric fixture 20 extends through the aperture 22 and into the central channel 38 of the heater assembly 34'. Stretching the elastomeric fixture 20 upon initial insertion allows the diameter of the mounting section 28 to decrease in size, thereby facilitating easy slide-in engagement of the elastomeric fixture 20 with the aperture 22 and the central channel 38. Consequently, when the elastomeric fixture 20 is released, it shortens in length and increases in diameter to engage the aperture 22 and form a bulge 90 in the location of the central channel 38. The elastomeric fixture 20 is then fed through the heater assembly 34' and stretched by pulling on the second handle section 30. Once released, the elastomeric fixture 20 shortens and forms a second bulge 92 above a thermal insulative cover 94, which draws the heater assembly 34' into engagement with the curved substrate 84 simultaneously while maintaining the open nutplate fastener assembly 16 in engagement on an opposite side of the curved substrate 84.

In the case of nutplate replacement operations, the curved substrate 84 may include a previous adhesive bonding agent 96 that ends up underneath a new adhesive bonding agent 98. Here, the nut element retaining section 26 firmly disposed within the interior of the nut element 86 at least partially extending into the series of internal threads 88 prevents the adhesive bonding agent 98 from pushing up into the nut element 86 and into the internal threads 88.

The thermal insulative cover 94 of the heater assembly 34' illustrated in FIG. 7 provides a thermal insulation barrier to the heat generated therein so the heater assembly 34' can be handled by hand. This insulative cover 94 generally circumferentially surrounds a thermal insulation layer 100 sandwiched between the insulative cover 94 and a flexible heater pad 102. In this embodiment, the flexible heater pad 102 is able to deform at least at the heat transfer face 40 so as to conform to the curved substrate 84 in the manner shown in FIG. 7. The flexible heater pad 102 may be a single circumferential heater pad that generally encompasses or otherwise encircles the central channel 38, or the flexible heater pad 102 may include multiple flexible heater pads 86 disposed internally within the thermal insulative cover 94 at intermittent locations (e.g., positioned circumferentially equidistantly from one another), which may provide better conformance to the geometry of the curved substrate 84. The flexible heater pad 102 may couple to the electric heater control box 72 (not shown in FIG. 7) by way of the heater power leads 74. Moreover, FIG. 7 also more specifically illustrates one deployment of the temperature probe 76 positioned to the interior of the heater coils 68 and extending downwardly into contact with the surface of the curved substrate 84, thereby in a position to take real-time temperature readings thereof. Of course, the temperature probe 76 may also couple to the electric heater control box 72 by way of the thermocouple leads 78, as described above with respect to FIG. 4.

Figure 8:
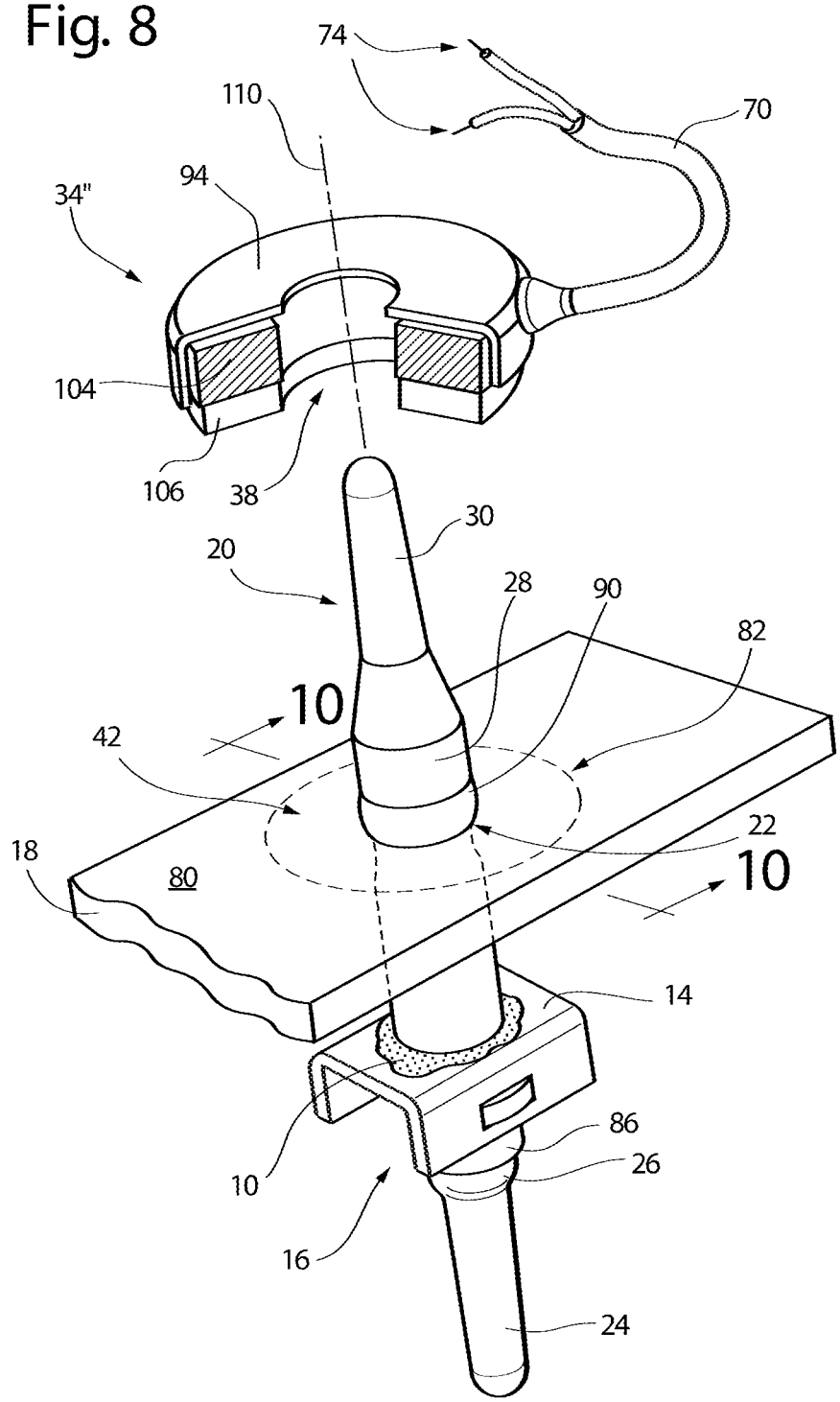
FIG. 8 is an environmental exploded perspective view of an alternative embodiment of the heater assembly incorporating a thermistor heating element and a conductive pad.

FIG. 8 illustrates another alternative embodiment of the heater assembly 34". In this embodiment, the primary heating element of the heater assembly 34" is a thermistor heating element 104 encased by the outer thermal insulative cover 94 on one side and includes a thermal conductive pad 106 on another side. The thermal conductive pad 106 is placed adjacent the heating area 42 on the top surface 80 of the substrate 18 during heated curing. In this embodiment, the external cord 70 coupled to the thermistor heating element 104 may house only a pair of the heater power leads 74 that couple to the electric heater control box 72 (not shown in FIG. 8), as described above. In this respect, the thermistor heating element 104 may be made from a sintered semiconductor material that exhibits a negative temperature coefficient that causes an increase in electrical resistance as the thermistor heating element 104 increases in temperature. As a result, the thermistor heating element 104 basically includes an integrated automatic feedback loop that allows the thermistor heating element 104 to self-regulate its temperature, thereby simultaneously self-regulating the temperature imparted to the heating area 42.

Figure 11:
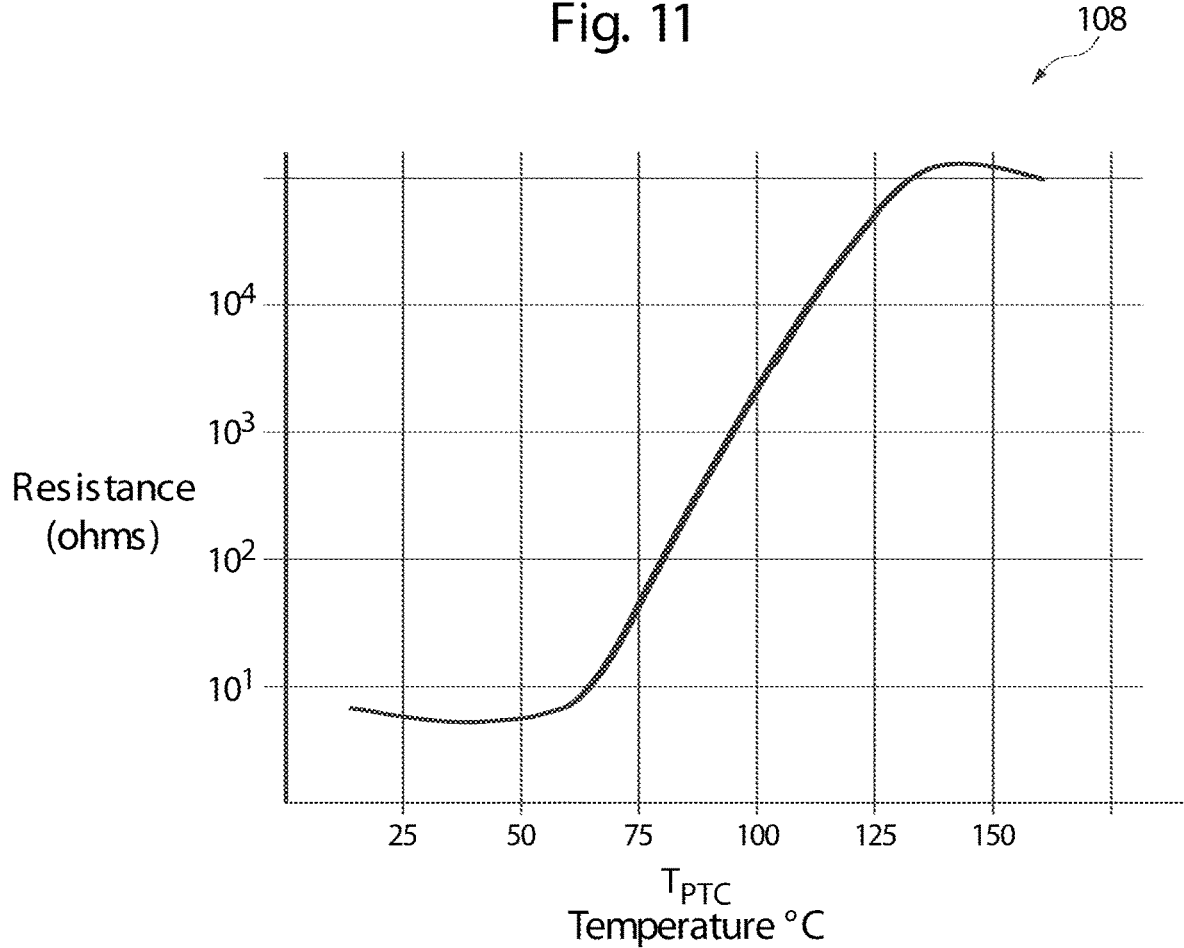
FIG. 11 is a graph illustrating the electrical resistance-to-temperature relationship of one thermistor compatible with the embodiments disclosed herein.

In this respect, FIG. 11 is a feedback graph 108 illustrating one configuration of the thermistor heating element 104. In particular, the graph 108 illustrates that the amount of electrical resistance within the thermistor heating element 104 remains fairly constant (i.e., under 10 ohms) until approximately sixty (60) degrees Celsius (° C.). Thereafter, as shown in FIG. 11, the electrical resistance of the thermistor heating element 104 increases significantly with each degree of temperature increase. For example, between 60° C. and 75° C., the resistance may increase to nearly 100 ohms—nearly 10 times the resistance at or below 60° C. Similarly, an increase in another 25° C. results in a resistance that increases to 1000 ohms—nearly 100 times the resistance at or below 60° C. Increased resistance results in decreased current and consequently decreased power output. Thus, such a thermistor heating element 104 may self-regulate its temperature and further prevent run-away heating because it decreases current throughput with temperature increases. Of course, the graph 108 is just one example of a thermistor heating element 104 compatible with the embodiments disclosed herein. Other thermistor heating elements known in the art, and having different resistance-to-temperature curves may also be used, depending on the desired application and use (e.g., such as the type of adhesive bonding agent 10).

In FIG. 8, the elastomeric fixture 20 is coupled to the open nutplate fastener assembly 16 having the adhesive bonding agent 10 disposed on the baseplate 14. The first handle section 24 of the elastomeric fixture 20 protrudes out from the open side of the open nutplate fastener assembly 16 and the nut element retaining section 26 is firmly disposed within the interior of the nut element 86, thereby at least partially extending into the series of internal threads 88 (not shown in FIG. 8), as described above. In FIG. 8, the mounting section 28 has been pulled at least partially through the aperture 22 in the substrate 18 and is coaxially aligned with the central channel 38 in the heater assembly 34" along a common axis 110 for slide-in engagement therewith. As shown, the mounting section 28 has a larger diameter relative to the nut element retaining section 26 and the second handle section 30. As the elastomeric fixture 20 is pulled along the common axis 110, it stretches along its length and the mounting section 28 may decrease in diameter to facilitate passing though the aperture 22 and/or the central channel 38 in the heater assembly 34". Consequently, when the elastomeric fixture 20 is released, it shortens in length and increases in diameter.

In this respect, FIG. 8 illustrates the mounting section 28 engaged with the aperture 22, thereby forming the bulge 90. The elastomeric fixture 20 is stretched to be fed through the heater assembly 34" by pulling on the second handle section 30. As described above, once fully inserted through the aperture 22 and the central channel 38, the elastomeric fixture 20 shortens when it is released. This draws the heater assembly 34" into engagement with the top surface 80 of the substrate 18 simultaneously while maintaining the open nutplate fastener assembly 16 in engagement on an opposite side of the substrate 18 as shown. Current may then be transferred to the thermistor heating element 104 by the heater power leads 74 to generate heat applicable to the heating area 42, which is conductively transferred to the adhesive bonding agent on the other side of the substrate 18.

Figure 9:
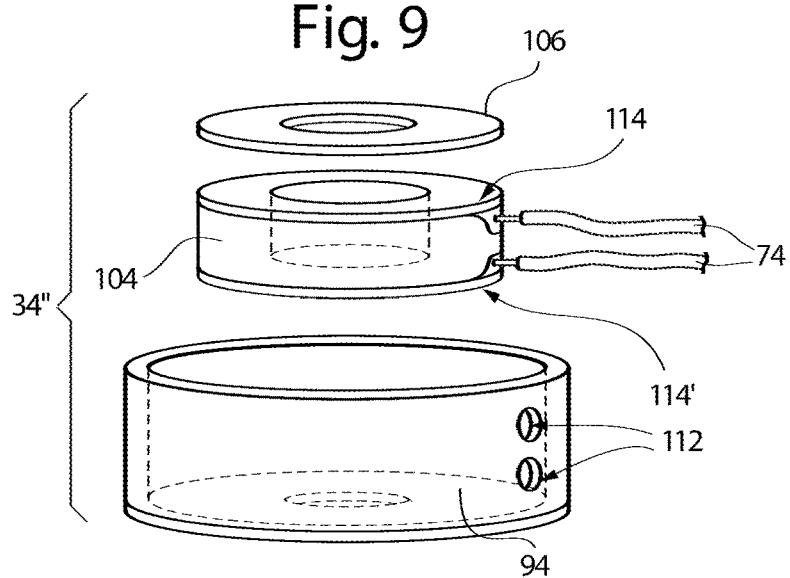
FIG. 9 is an exploded perspective view of the heater assembly of FIG. 8, incorporating the internal thermistor heating element.

FIG. 9 is an exploded side view of one configuration of the heater assembly 34" including the thermistor heating element 104, as disclosed herein. More specifically, FIG. 9 illustrates that the heater assembly 34" includes the thermal insulative cover 94 having a generally hollow cylindrical configuration with an internal diameter relatively larger than an external diameter of the thermistor heating element 104, which permits select slide-in reception of the thermistor heating element 104 into the interior of the thermal insulative cover 94. Moreover, the sidewalls of the thermal insulative cover 94 may include a pair of ports 112 having a size and shape to facilitate pass-through engagement of the pair of heater power leads 74. This allows the internally disposed thermistor heating element 104 to couple to an electrical source (not shown) for purposes of generating heat, as disclosed herein. Current supplied by the heater power leads 74 generates heat within the body of the thermistor heating element 104, which is conductively transferred to a pair of electric contact surfaces 114, 114'. In particular, heat generated at the electric contact surface 114 is conductively transferred directly to the overlying thermal conductive pad 106, which may include a surface area commensurate in scope with the approximate size of the bondline area 82 adjacent the adhesive bonding agent 10 applied to the substrate 18.

As shown in FIG. 9, the thermal conductive pad 106 may be relatively larger than the surface area of the electric contact surface 114 and/or the thermistor heating element 104, yet sized to fit within the thermal insulative cover 94. Additionally, the thermal insulative cover 94 may be designed to insulate heat transfer from the electric contact surface 114' so the exterior of the thermal insulative cover 94 of the heater assembly 34" is safe to handle by hand.

Figure 10:
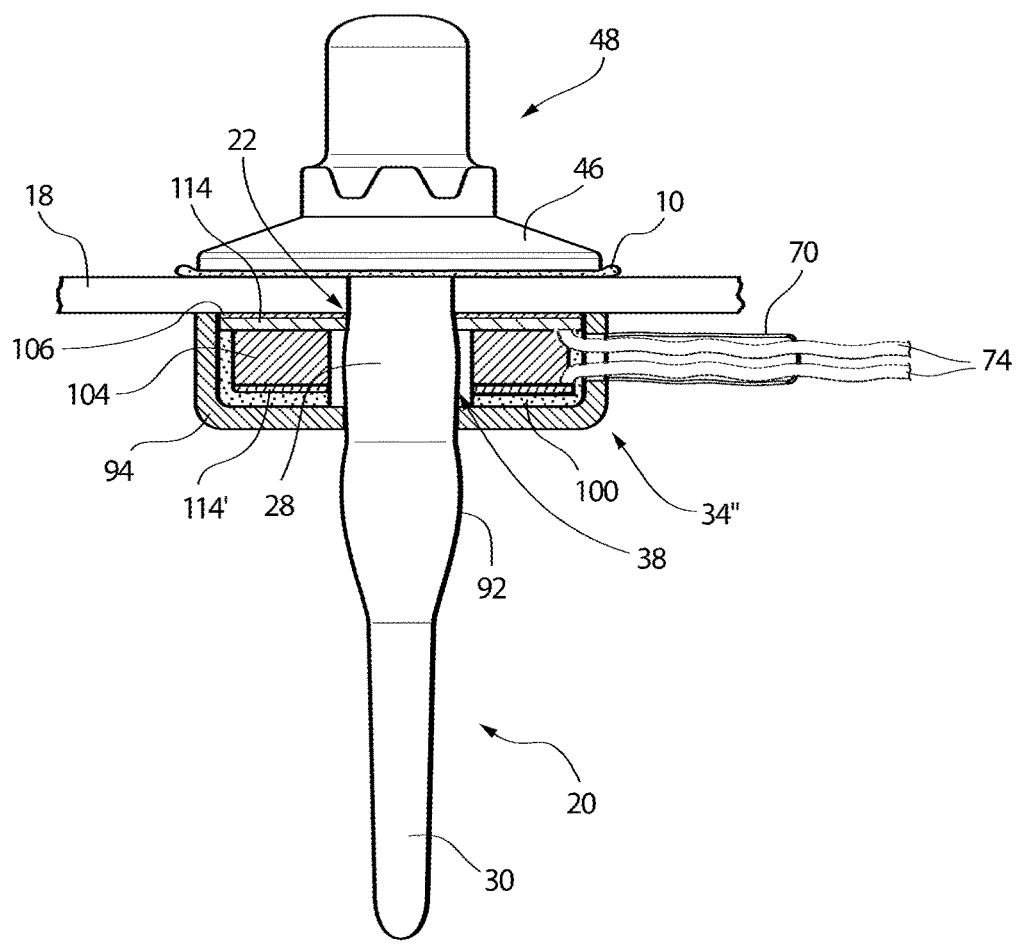
FIG. 10 is a cross-sectional view of the heating element, similar to that taken along the line 10-10 in FIG. 8 except with the sealed nutplate fastener assembly instead of the open nutplate fastener assembly, further illustrating seated engagement of the thermistor heating element with the substrate underneath the bondline.

Additionally, FIG. 10 is a cross-sectional view more specifically illustrating engagement of the heater assembly 34" and the sealed nutplate fastener assembly 48 to respective sides of the substrate 18. In this respect, the cross-sectional view illustrate in FIG. 10 is generally taken about the line 10-10 in FIG. 8, except that the open nutplate fastener assembly 16 in FIG. 8 has been replaced with the sealed nutplate fastener assembly 48. As shown, the elastomeric fixture 20 coupled to the sealed nutplate fastener assembly 48 has been drawn through the aperture 22 in the substrate 18 and the central channel 38 in the heater assembly 34" such that the baseplate 46 and the thermal conductive pad 106 are adjacent opposite sides of the substrate 18.

FIG. 10 further illustrates that the elastomeric fixture 20 extends through the aperture 22 and into the central channel 38 of the heater assembly 34". Stretching the elastomeric fixture 20 upon initial insertion allows the diameter of the mounting section 28 to decrease in size, thereby facilitating easy slide-in engagement of the elastomeric fixture 20 with the aperture 22 and the central channel 38. Consequently, when the elastomeric fixture 20 is released, it shortens in length and increases in diameter to engage the aperture 22 and the central channel 38. In this respect, FIG. 10 illustrates the second bulge 92 behind the thermal insulative cover 94, which helps draw the heater assembly 34" into engagement with the substrate 18 simultaneously while maintaining the sealed nutplate fastener assembly 48 in engagement on an opposite side of the substrate 18. The thermal insulative cover 94 of the heater assembly 34" illustrated in FIG. 10 provides a thermal insulation barrier to the heat generated therein by the thermistor heating element 104 so the heater assembly 34" can be handled by hand. In this embodiment, the temperature probe 76 is unneeded as the thermistor heating element 104 self-regulates the heat generated therein and applied to the substrate 18 by way of the thermal conductive pad 106.

The heater assembly 34" having the thermistor heating element 104 (e.g., a ceramic self-regulating heater element) may be desired in view that the heater control box 72 may not need additional circuitry to interpret and process temperature readings in real-time or at select intervals. This also means that the temperature probe 76 may not be needed. Moreover, the heater control box 72 also may not need to include the connectors for the thermocouple leads 78 and/or the external cord 70 does not need to house the additional wiring for the leads 78. In essence, the embodiments disclosed with respect to FIGS. 8-10 may simplify the application of heat to the bondline area 82 where either of the open nutplate fastener assembly 16 or the sealed nutplate fastener assembly 48 attach to the substrate 18, the curved substrate 84, or another surface or substrate as known in the art.

Figure 1:
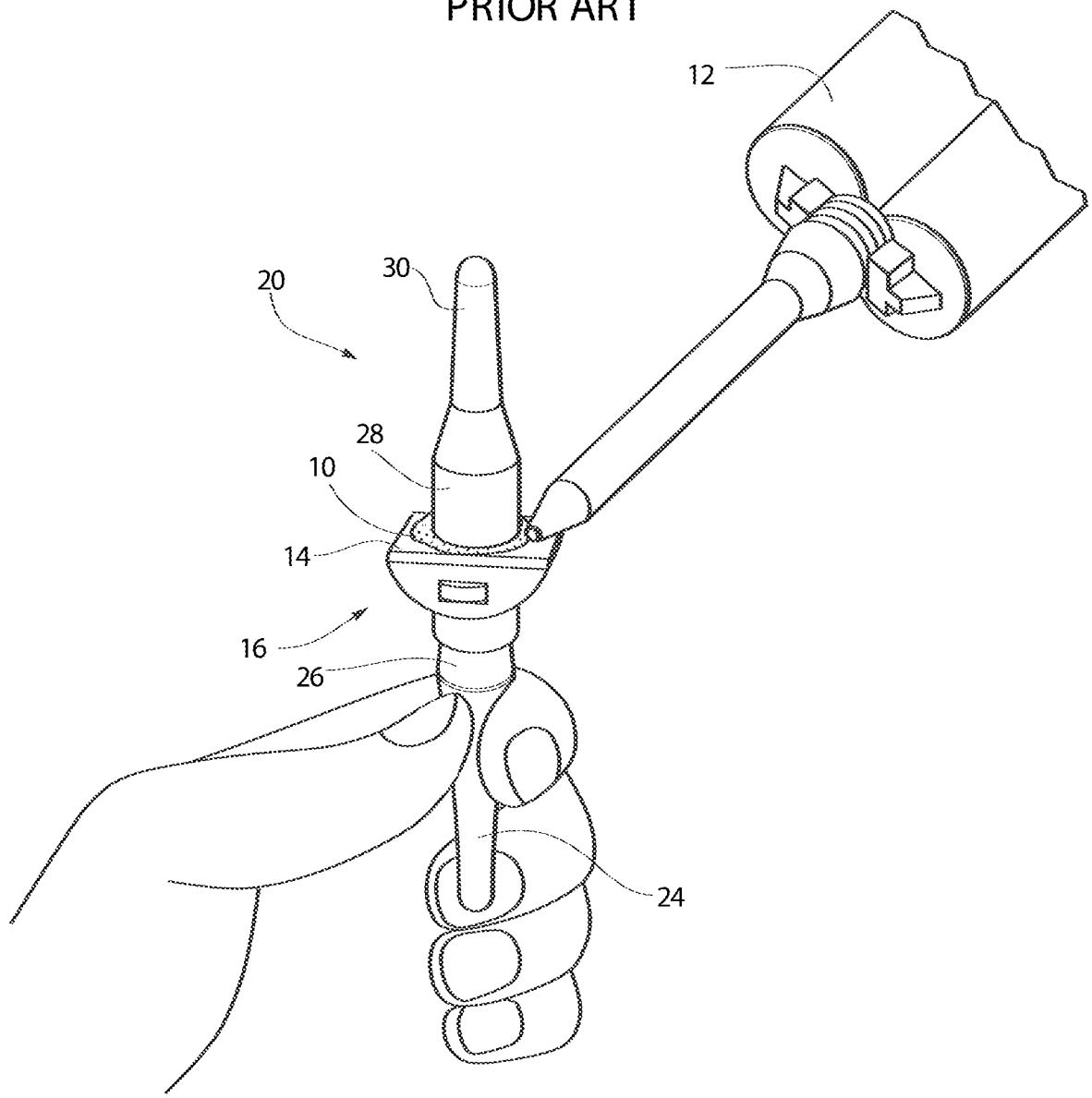
FIG. 1 is an environmental perspective view illustrating application of an adhesive bonding agent to the bottom of a baseplate of a prior art open nutplate fastener assembly.
Figure 2A:
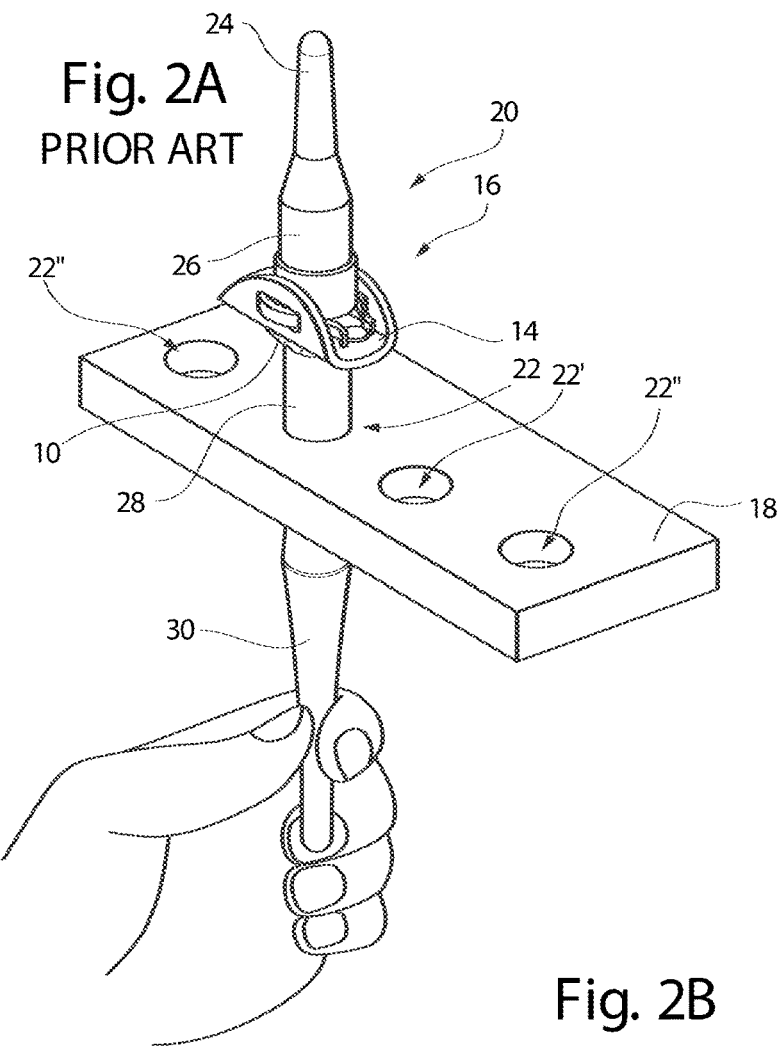
FIG. 2A is an environmental perspective view illustrating drawing an elastomeric fixture through an aperture in a substrate to draw the baseplate having the adhesive bonding agent underneath into pressurized engagement with the substrate.
Figure 2B:
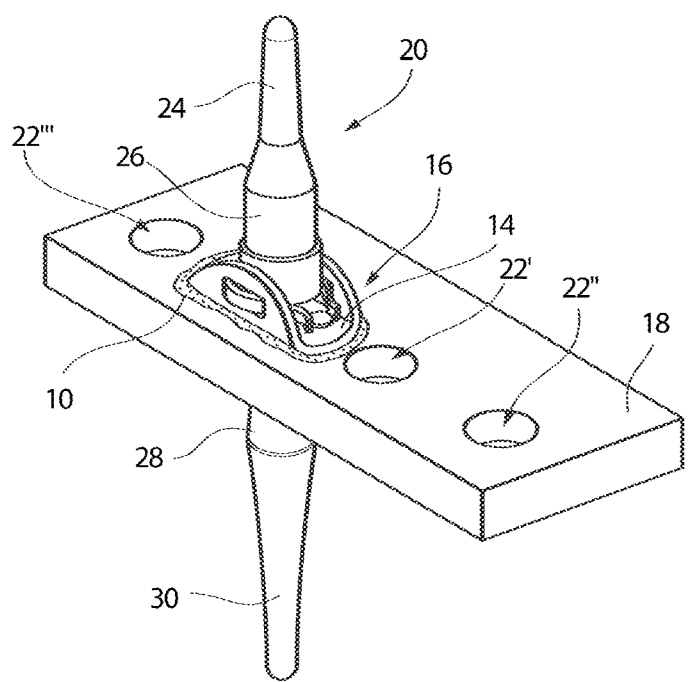
FIG. 2B is an environmental perspective view illustrating the baseplate of the open nutplate fastener assembly of FIGS. 1 and 2A in pressurized engagement with the substrate during curing.

To facilitate attachment of any of the heater assemblies 34, 34', 34", 34''' disclosed herein, one or more linear beads of a mixed adhesive may first be applied along the baseplate 14 (or the baseplate 46) of the open nutplate fastener assembly 16 (or the sealed nutplate fastener assembly 48), as shown and described generally with respect to FIG. 1. For example, one adhesive bead may be deposited around each side of the baseplate 14 (or the baseplate 46), and the amount of material in the bead should be sufficient to provide a uniform amount to squeeze out from underneath when the baseplate 14 (or the baseplate 46) is pulled into engagement against the substrate 18 (or the curved substrate 84). The elastomeric fixture 20 is able to be pulled through the aperture 22 so that it is accessible on the other side of the substrate 18 (or the curve substrate 84). Here, the second handle section 30 of the elastomeric fixture 20 protruding through the aperture 22 can be pulled through the central channel 38 in the heater assembly 34, 34', 34", 34'". FIGS. 4 and 8, for example, illustrate the elastomeric fixture 20 concentrically aligned with the central channel 38 along the common axis 110. Pulling the elastomeric fixture 20 may cause it to deform along its length, thereby lengthening the elastomeric fixture 20 while at the same time decreasing its diameter. This helps facilitate slide-through engagement through the aperture 22 and the central channel 38.

Accordingly, the elastomeric fixture 20 is pulled further through the aperture 22 until the open nutplate fastener assembly 16 (or the sealed nutplate fastener assembly 48) is seated against the substrate 18 and the elastomeric fixture 20 is fully engaged with the heater assembly 34 (i.e., threaded through), as shown in FIGS. 5, 7, and 10. Here, once the elastomeric fixture 20 is released, it relaxes back to its static state, i.e., the elastomeric fixture 20 decreases in length and increases in diameter to more fully expand into the aperture 22 and the central channel 38 of the heater assembly 34, 34', 34", 34'". As the elastomeric fixture 20 increases in diameter, it increases the amount of surface friction within the central channel 38 (and may even bulge inwardly as shown in FIGS. 7-8 and 10). Moreover, as the elastomeric fixture 20 shrinks in length, the friction fit within the central channel 38 draws the heater assembly 34, 34', 34", 34'" upwardly into engagement with the bottom surface 44 of the substrate 18, thus sandwiching the substrate 18 between the heat transfer face 40 (FIG. 6) and the adhesive bonding agent 10 underneath the baseplate 14 (or the baseplate 46). In particular, the elastomeric fixture 20 coaxially aligns and holds the open the nutplate fastener assembly 16 (or the sealed nutplate fastener assembly 48) to the substrate 18 and keeps the adhesive bonding agent 10 out of the aperture 22, out of the threaded channel 32, and out of the central channel 38. The elastomeric fixture 20 effectively holds the configuration shown in FIGS. 5, 7, and 10 until the curing process completes and the elastomeric fixture 20 is pulled out.

While the open nutplate fastener assembly 16 (or the sealed nutplate fastener assembly 48) and the heater assembly 34, 34', 34", 34'" are in the positions shown in FIGS. 5, 7, and 10, e.g., the heater assembly 34, 34', 34", 34'" may then be activated. In one embodiment, the heater assembly 34, 34', 34", 34'" may be activated by the electric heater control box 72, which generates energy to supply power to the heater coils 68 and/or the thermistor heating element 104 within the cylindrical case 36 or the thermal insulative cover 94 to produce heat therein. In this respect, the cylindrical case 36 may include the outer sheath or thermal insulative cover 94 to permit direct handling of the heater assembly 34, 34', 34", 34'" without the cylindrical case 36 becoming too hot to handle by hand. The thermal insulative cover 94 may also serve the purpose of increasing the efficiency of the heater assembly 34, 34', 34", 34'" by thermally insulating the outer cylindrical structure and directing conductive heat toward the heat transfer face 40. In this respect, the heat transfer face 40 may include a pressure pad 116 (FIG. 5) or the thermal conductive pad 106 made from copper or another highly thermally conductive material or the like to further facilitate the efficient transfer of heat energy to the heating area 42. Alternatively, the heat transfer face 40 may be made from flexible conductive materials, such as a plastic or polymer material having a high conductance to heat energy.

As shown in FIG. 5, the heat energy generated by the heater assembly 34, 34', 34", 34'" warms the bottom surface 44 of the substrate 18 in and around the baseplate 14 (or the baseplate 46), as indicated by a series of heat arrows 118. Accordingly, the uncured adhesive bonding agent 10 begins accelerated curing into a bonded adhesive bonding agent.

During heating, the electric heater control box 72 may monitor the temperature at the heat transfer face 40 and/or the heating area 42. Accordingly, the electric heater control box 72 may adjust the amount of energy delivered to the heater coil 68 depending on real-time temperature feedback from the temperature probe 76, and the curing characteristics of the adhesive bonding agent 10. The heater control box 72 may not necessarily need to regulate the energy delivered to the thermistor heating element 104, as described above.

After the adhesive bonding agent 10 has cured, the electric heater control box 72 may turn the energy source "off" after four or less hours of curing, thereby allowing the heater coil 68 and/or the thermistor heating element 104 to cool. Next, the elastomeric fixture 20 is removed from the open nutplate fastener assembly 16 or the sealed nutplate fastener assembly 48 bonded to the substrate 18 and from the heater assembly 34, 34', 34", 34'" by simply pulling downwardly on the second handle section 30 until the elastomeric fixture 20 stretches out of friction fit engagement with the open nutplate fastener assembly 16 or the sealed nutplate fastener assembly 48, the aperture 22, and the central channel 38. Thereafter, the curing process is complete and the elastomeric fixture 20 can be recycled.

Figure 14:
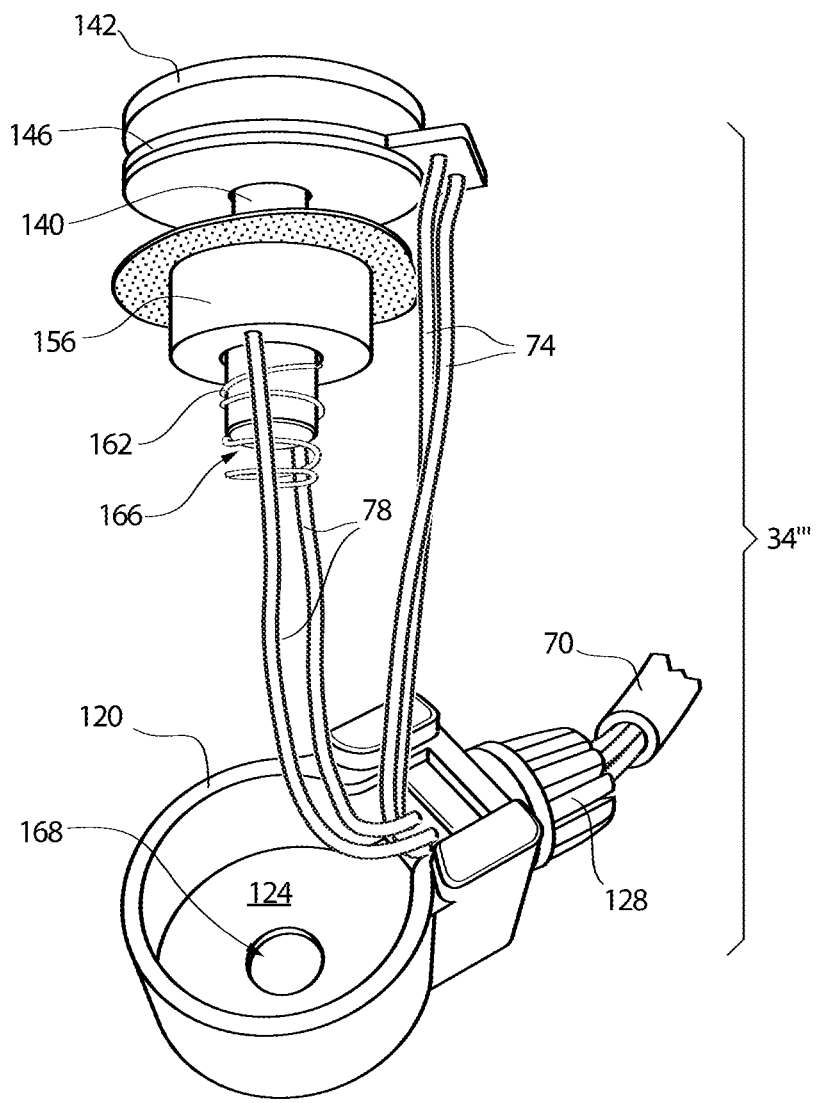
FIG. 14 is a partial exploded perspective view of the alternative embodiment of the heater assembly of FIGS. 12 and 13.

FIGS. 12-14 illustrate another alternative embodiment of the heater assembly 34'". More specifically, FIG. 12 illustrates the heater assembly 34'" in exploded relation relative to the open nutplate fastener assembly 16. In this embodiment, the heater assembly 34'" includes a heater shell 120 generally forming in outer protective casing that retains an internally located insulation sleeve 122 generally residing flush against an interior cylindrical wall of an internal surface 124 of the heater shell 120. As in the other embodiments disclosed herein, the insulation sleeve 122 generally insulates the heater shell 120 and helps prevent heat generated by the heater assembly 34'" from conducting outwardly to the heater shell 120 during use. This helps ensure that the heater shell 120 remains at a temperature safe for handling, even after immediate use, while also more efficiently directing heat energy to the substrate 18 for purposes of curing the adhesive bonding agent 10.

A cable grip 126 may include a generally circular nose 128 having an aperture 130 therein suitable to accommodate the external cord 70 housing the heater power leads 74 and/or the thermocouple leads 78. The cable grip 126 may insert through an open top 132 of the heater shell 120 for extension through an aperture 134 therein sized to accommodate the outer diameter of the nose 128. The cable grip 126 may further include a generally planar flange 136 generally relatively larger than the aperture 134 and configured to abut inside of the heater shell 120 in flush relation once inserted therein. The planar flange 136 effectively prevents the cable grip 126 from sliding out from within the interior of the heater shell 120 after insertion. The heater shell 120 may further be configured for snap-fit engagement with the planar flange 136 of the cable grip 126 to further lock the cable grip 126 therein. As such, the external cord 70 may feed the heater power leads 74 and/or the thermocouple leads 78 to the interior of the heater shell 120 by way of the aperture 130 in the cable grip 126 and the aperture 134 in the heater shell 120.

Moreover, the heater shell 120 generally encases an interface plate 138 having a cylindrical tube 140 extending away from a generally larger diameter circular disk 142 coupled at one end thereto. The interface plate 138 includes a generally cylindrical channel 144 having a size and shape to accommodate insertion of the elastomeric fixture 20, and specifically initial insertion of the second handle section 30, in accordance with the embodiments disclosed herein. The cylindrical tube 140 may extend through an aperture 144 in a ceramic heater 146 having a pair of leads 148, 150 that selectively couple to the heater power leads 74 for receiving power from an electrical source during operation thereof. The ceramic heater 146 may include a surface 152 that mates flush with the circular disk 142 of the interface plate 138 for efficient transfer of heat energy generated by the ceramic heater 146 during operation thereof. Of course, as disclosed herein, a top surface 154 of the circular disk 142 may be designed to sit flush against the substrate 18 and underneath the bondline area 82 for purposes of heat curing the adhesive bonding agent 10 as discussed in detail herein.

The heater assembly 34''' illustrated in FIG. 12 may also include a thermocouple ring 156 that includes a pair of thermocouples 158 extending outwardly and designed to contact the ceramic heater 146. Each of the thermocouples 158 may couple with a corresponding lead 160 extending therefrom, wherein each lead 160 is configured to couple with one of the thermocouple leads 78. This way, each thermocouple 158 may communicate real-time temperature information back to, e.g., the electric heater control box 72 for regulation of heat generated by the ceramic heater 146. For example, the electric heater control box 72 may regulate the energy delivered to the ceramic heater 146 by way of the heater power leads 74 coupled with the leads 148, 150.

A spring 162 may be biased between an interior top surface of the heater shell 120 and the bottom of the thermocouple ring 156 to generally push the thermocouple ring 156 into engagement with the ceramic heater 146. This may enhance the accuracy of measuring the temperature of the ceramic heater 146 through proximate, and possibly constant, engagement therewith. A corresponding retaining ring 164 may selectively engage a lower end 166 of the cylindrical tube 140 on the outside of the heater shell 120, such as by way of extension of the cylindrical tube 140 out through the heater shell 120 via an aperture 168 (FIG. 14) therein, to ensure that the heater assembly 34''' remains in the compact configuration as illustrated, e.g., in FIG. 13. Furthermore, FIG. 14 is a partial exploded perspective view of the heater assembly 34''' illustrated with respect to FIG. 12.

Once in the compact position illustrated in FIG. 13, the second handle section 30 may selectively slide through the interior of the heater assembly 34''' by way of the aperture 144 in the interface plate 138. This allows the user to draw the open nutplate fastener assembly 16 into engagement with the substrate 18 for application of heat to the adhesive bonding agent 10 in accordance with the embodiments as disclosed herein.

Figure 15:
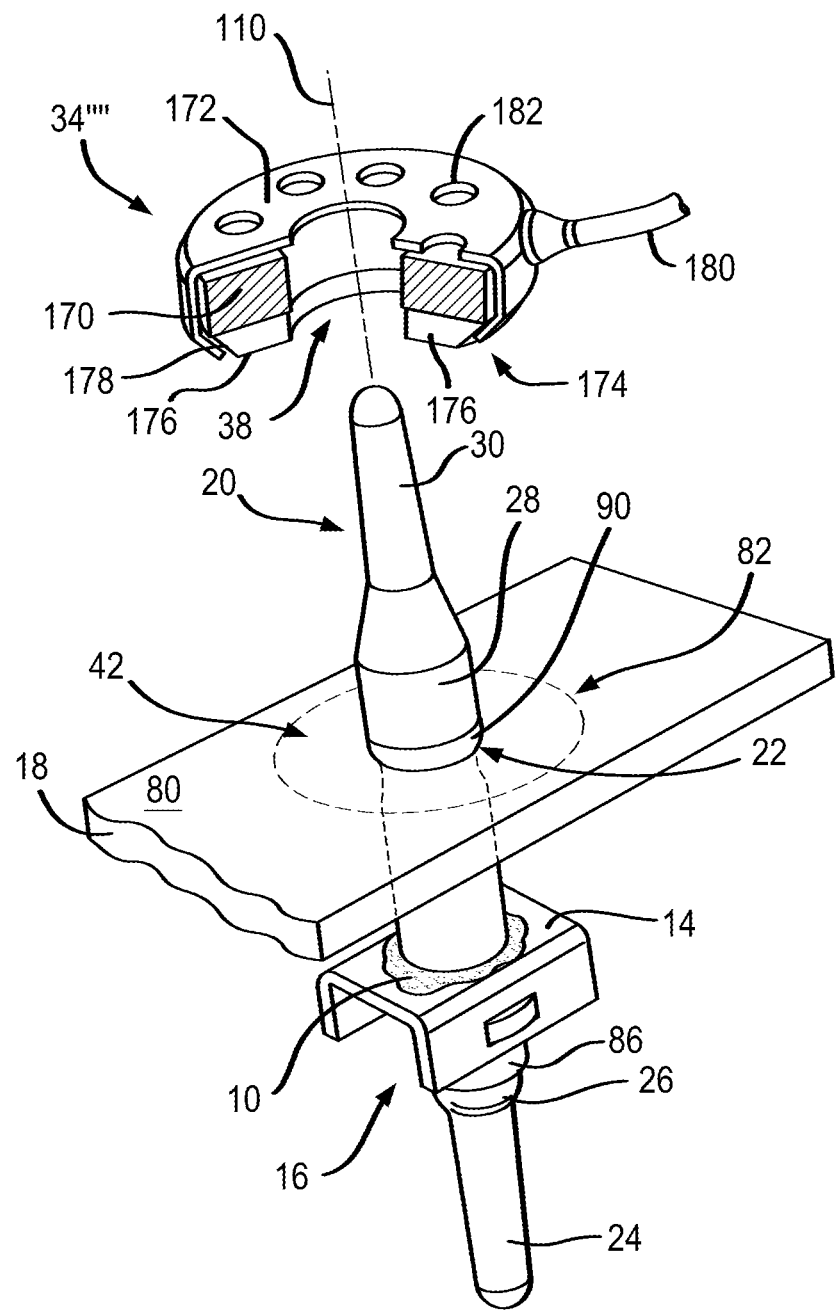
FIG. 15 is an environmental exploded perspective view of another alternative embodiment of the heater assembly, including wherein the heater is in the form of a solid fuel pyrotechnic ring.

FIG. 15 illustrates another alternative embodiment of the heater assembly 34'''' including a molded solid fuel ring 170 generally enclosed by a case 172 having a rolled lower edge 174 inwardly projecting to retain a heat transfer surface pad 176 therein. The heat transfer surface pad 176 may include a beveled edge 178 also generally projecting inwardly toward the common axis 110 and tracking the general inward projection of the rolled lower edge 174. This may allow the case 172 to retain the heat transfer surface pad 176 and/or the molded solid fuel ring 170. Moreover, as shown in FIG. 15, the molded solid fuel ring 170 may be generally positioned flush against the heat transfer surface pad 176 across a circumferential surface generally extending around the central channel 38. This may maximize heat transfer from the molded solid fuel ring (i.e., the heat source), through the heat transfer surface pad 176, and to the heating area 42 on the substrate 18. Such flush positioning of the molded solid fuel ring 170 relative to the heat transfer surface pad 176 over a relatively larger surface area may also more evenly distribute heat to the heating area 42. The molded solid fuel ring 170 may also couple to a fuse 180 ignitable from a distance and used to initiate burning of the molded solid fuel ring 170 within the case 172.

Moreover, the case 172 may include one or more of a plurality of ports 182 therein and generally positioned on an opposite side of the case 172 from the heat transfer surface pad 176 to vent gas out from within an interior of the case 172 during combustion of the molded solid fuel ring 170. The molded solid fuel ring 170 should be slow burning to moderate the temperature applied to the heating area 42 during operation of the heater assembly 34''''. Such moderated heating may more efficiently cure the adhesive bonding agent 10 on the open nutplate fastener assembly 16. Additionally, moderated burning of the molded solid fuel ring 170 may regulate the temperature at the heat transfer surface pad 176 for staying below a softening point of the elastomeric fixture 20 used in connection therewith. Moderated burning of the molded solid fuel ring 170 may also provide for continued application of a relatively constant temperature for a predetermined time, in addition to temperature regulation.

Figure 16:
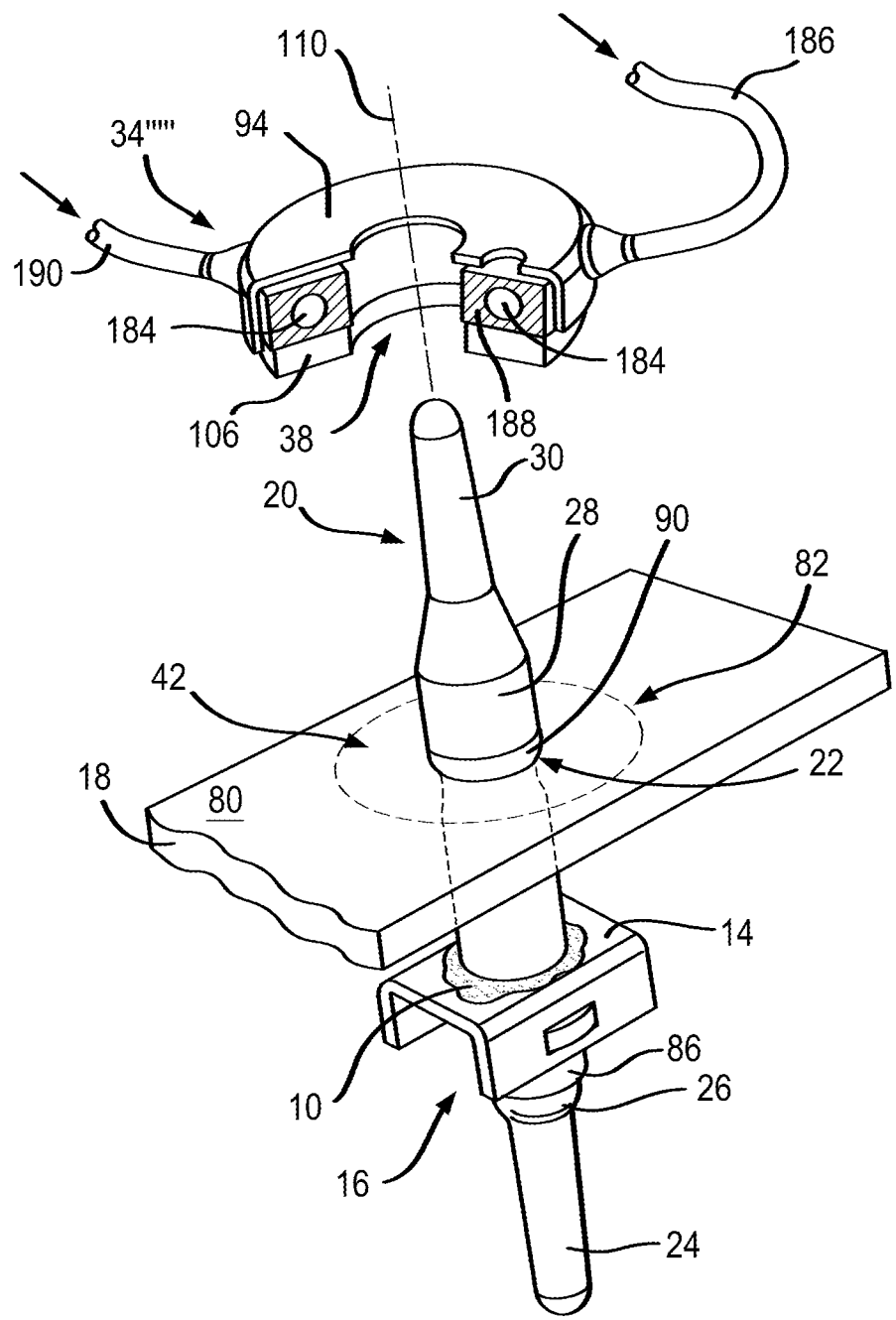
FIG. 16 is an environmental exploded perspective view of another alternative embodiment of the heater assembly, including wherein the heater includes a toroidal fluid passage.

FIG. 16 illustrates another alternative embodiment of the heater assembly 34''''' as disclosed herein. As shown in this embodiment, the heater assembly 34''''' is in the form of a radiator-type heater element that includes an internal fluid passage 184 fluidly coupled to an input hose 186 for transferring a relatively high temperature fluid to the heater assembly 34''''' and through a conductive heating element 188 therein. Similar to the above, the heating element 188 may be positioned in flush relation to the thermal conductive pad 106 to increase the surface area by which heat energy transfers to the heating area 42 of the substrate 18 during operation thereof. The circulated heated fluid may then exit the heater assembly 34''''' by way of an output hose 190 that may recirculate the fluid to an energy source for increasing the temperature thereof for eventual redelivery to the heater assembly 34''''' by way of the input hose 186.

More specifically, in one embodiment, a fluid heater with temperature control and circulation pump may maintain the temperature of the fluid moving through the internal fluid passage 184 in the heating element 188 at a predetermined temperature that transfers sufficient heat energy to the thermal conductive pad 106 to maintain the heating area 42 at a desired relatively constant temperature to cure the adhesive bonding agent 10, such as within four hours. Of course, the temperature profile applied to the surface 80 of the substrate 18 may be regulated by the temperature of the fluid flowing through the heater assembly 34, and may depend on the curing characteristics of the adhesive bonding agent 10. In this embodiment, the thermal insulative cover 94 may generally insulate and deflect heat from the relatively higher temperature fluid flowing through the heater assembly 34 down toward the thermal conductive pad 106 for transfer to the heating area 42. The insulative nature of the cover 94 may also permit direct handling of the heater assembly 34 as shown in FIG. 16.

Although several embodiments have been described in detail for purposes of illustration, various modifications may be made without departing from the scope and spirit of the invention. Accordingly, the invention is not to be limited, except as by the appended claims.

What is claimed is:

1. A heater assembly, comprising:
   a case having a heating element therein;
   a channel extending through the case and having a size and shape for selectively receiving therethrough a first end of an elastomeric fixture outstretched through a substrate to a first length having a first width; and
   a heat transfer surface positioned relative to the heating element for receiving generated heat therefrom, the heat transfer surface being positionable relative to the substrate to cooperate with an adhesively bondable attachment coupled to a second end of the elastomeric fixture opposite the first end and having an uncured bonding agent disposed thereon to simultaneously sandwich the substrate in compression engagement when the elastomeric fixture extending through the substrate and into the central channel relaxes to a second relatively shorter length having a second relatively larger width.

2. The heater assembly of claim 1, including an electrical lead coupling the heating element to a power source for providing on-demand energy to the heating element.

3. The heater assembly of claim 1, including a thermal insulation layer disposed to an exterior of the heating element.

4. The heater assembly of claim 3, wherein the thermal insulation layer comprises an insulative cover or an insulative sleeve positioned between the case and the heating element.

5. The heater assembly of claim 1, wherein the heating element comprises a heater coil generally circumferentially wound about the channel for generating heat in adjacent relation relative thereto.

6. The heater assembly of claim 1, including a temperature probe extending relative to the case by a distance sufficient to contact the substrate when the heater assembly is in compression engagement therewith with the adhesively bondable attachment.

7. The heater assembly of claim 1, wherein the heat transfer surface comprises a flexible heater pad deformable for flush engagement with a curved substrate.

8. The heater assembly of claim 7, wherein the flexible heater pad comprises a single circumferential heater pad generally encompassing the channel or multiple flexible heater pads disposed at relatively equidistant locations about the channel.

9. The heater assembly of claim 1, wherein the heating element comprises a thermistor generally enclosed within a thermal insulative cover by a thermal conductive pad.

10. The heater assembly of claim 9, wherein the thermistor comprises a ceramic or a sintered semiconductor material including an integrated feedback loop having a negative temperature coefficient that increases electrical resistance and decreases heat production with increased temperature and decreases electrical resistance and increases heat production with decreased temperature.

11. The heater assembly of claim 1, wherein the heating element comprises a resistance heater, an induction heater, or a coil heater.

12. The heater assembly of claim 1, wherein the case comprises a cylindrical case including a pair of housings configured for snap-fit engagement with one another to generally circumferentially enclose the heating element therein.

13. The heater assembly of claim 1, including a controller coupled with the heating element for regulating an amount of current delivered to the heater assembly.

14. The heater assembly of claim 1, wherein the adhesively bondable attachment comprises an open nutplate fastener assembly.

15. The heater assembly of claim 1, wherein the heating element comprises a fuel ring formed about the channel and positioned in adjacent relation with the heat transfer surface.

16. The heater assembly of claim 15, including a fuse selectively coupled with the fuel ring comprising a solid fuel pyrotechnic ring, for igniting the solid fuel pyrotechnic ring from a distance.

17. The heater assembly of claim 15, wherein the case includes one or more vent ports for venting combustion gases out from within the case during burning of the fuel ring.

18. The heater assembly of claim 15, wherein the case includes a rolled lower edge generally projecting inwardly and at least partially extending over and trapping therein a heat transfer surface pad having the heat transfer surface thereon while simultaneously exposing the heat transfer surface for contact with the substrate.

19. The heater assembly of claim 18, wherein the heat transfer surface pad includes a beveled edge accommodating inward projection of the rolled lower edge about the heat transfer surface pad.

20. The heater assembly of claim 1, wherein the heating element comprises a conductive material having an internal fluid passage therein for receiving fluid at a relatively high temperature, the conductive material conductively transferring heat from the relatively higher temperature fluid flowing therethrough to the heat transfer surface.

21. The heater assembly of claim 20, wherein the internal fluid passage comprises a toroidal fluid passage coupling to an inlet hose on one port and an outlet hose on another port.

22. The heater assembly of claim 1, wherein the adhesively bondable attachment comprises a sealed nutplate fastener assembly.

23. A heater assembly, comprising:
    a cylindrical case including a pair of housings configured for engagement with one another to generally circumferentially enclose a cylindrically wound heater coil therein;
    a central channel extending through the case and having a size and shape for selectively receiving therethrough a first end of an elastomeric fixture outstretched through a substrate to a first length having a first diameter;
    a heat transfer surface positioned relative to the heater coil for receiving generated heat therefrom, the heat transfer surface being positionable relative to the substrate to cooperate with an adhesively bondable attachment coupled to a second end of the elastomeric fixture opposite the first end and having an uncured bonding agent disposed thereon to simultaneously sandwich the substrate in coaxial compressive engagement when the elastomeric fixture extending through the substrate and into the central channel relaxes to a second relatively shorter length having a second relatively larger diameter; and a temperature probe extending relative to the cylindrical case by a distance sufficient to contact the substrate when the heater assembly is in compressive engagement therewith with the adhesively bondable attachment.

24. The heater assembly of claim 23, including an electrical lead coupling the heater coil to a power source regulated by a controller for providing on-demand regulated current to the heater coil.

25. The heater assembly of claim 23, including a thermal insulation layer disposed to an exterior of the heater coil.

26. The heater assembly of claim 23, wherein the thermal insulative layer comprises an insulative cover or an insulative sleeve positioned between the cylindrical case and the heater coil and the heat transfer surface comprises a flexible heater pad deformable for flush engagement with a curved substrate.

27. The heater assembly of claim 26, wherein the flexible heater pad comprises a single circumferential heater pad generally encompassing the central channel or multiple flexible heater pads disposed at relatively equidistant locations about the central channel and the adhesively bondable attachment comprises an open nutplate fastener assembly or a closed nutplate fastener assembly.

28. A heater assembly, comprising:
an insulative case cooperating with a thermal conductive pad to generally encase a heating element comprising a thermistor therein; and
a central channel extending through the insulative case and having a size and shape for selectively receiving therethrough a first end of an elastomeric fixture outstretched through a substrate to a first length having a first diameter;
wherein the thermal conductive pad is positioned relative to the heating element for receiving generated heat therefrom, the thermal conductive pad being positionable relative to the substrate to cooperate with an adhesively bondable attachment coupled to a second end of the elastomeric fixture opposite the first end and having an uncured bonding agent disposed thereon to simultaneously sandwich the substrate in coaxial compression engagement when the elastomeric fixture extending through the substrate and into the central channel retracts to a second relatively shorter length having a second relatively larger diameter.

29. The heater assembly of claim 28, including an electrical lead coupling the heating element to a power source for providing on-demand current to the heating element.

30. The heater assembly of claim 28, wherein the thermistor comprises a ceramic or a sintered semiconductor material including an integrated feedback loop having a negative temperature coefficient that increases electrical resistance and decreases heat production with increased temperature and decreases electrical resistance and increases heat production with decreased temperature.

31. The heater assembly of claim 28, including a controller coupled with the heating element for regulating an amount of current delivered to the heater assembly.

32. The heater assembly of claim 28, wherein the adhesively bondable attachment comprises an open nutplate fastener assembly or a sealed nutplate fastener assembly.

33. A heater assembly, comprising:
a case generally enclosing a heating element comprising a ceramic heater;
a thermocouple within the case and generally biased into engagement with the ceramic heater;
an interface plate proximate the thermocouple for receiving heat energy generated thereby and having a central channel extending through the case and the thermocouple, the central channel having a size and shape for selectively receiving therethrough a first end of an elastomeric fixture outstretched through a substrate to a first length having a first diameter; and
a heat transfer surface outwardly facing from the interface plate and being positionable relative to the substrate to cooperate with an adhesively bondable attachment coupled to a second end of the elastomeric fixture opposite the first end and having an uncured bonding agent disposed thereon to simultaneously sandwich the substrate in coaxial compression engagement when the elastomeric fixture extending through the substrate and into the central channel retracts to a second relatively shorter length having a second relatively larger diameter.

34. The heater assembly of claim 33, including at least one sensor extending from the thermocouple and proximate the ceramic heater for sensing a real-time temperature of the ceramic heater.

35. The heater assembly of claim 34, wherein the thermocouple includes at least one lead configured for electrical coupling to a remote controller.

36. The heater assembly of claim 35, wherein the remote controller electrically couples with the ceramic heater for regulation of current delivered thereof in response to the real-time temperature of the ceramic heater.

37. The heater assembly of claim 33, including an insulative sleeve positioned between the case and the ceramic heater.

38. The heater assembly of claim 33, including a spring positioned between the case and the thermocouple.

39. The heater assembly of claim 38, wherein the central channel comprises a tube extending through the thermocouple, the spring, and the case and held therein by a retaining ring mountable to the tube outside the case.

40. The heater assembly of claim 33, wherein the interface plate is positioned in flush engagement with the thermocouple.

* * * * *